United States Patent
Jain et al.

(10) Patent No.: US 12,450,056 B2
(45) Date of Patent: Oct. 21, 2025

(54) EFFICIENT DATA LAYOUT AND ALIGNMENT FOR WIDE-VECTOR ACCELERATOR SYSTEMS

(71) Applicant: International Business Machines Corporation, Armonk, NY (US)

(72) Inventors: Shubham Jain, Elmsford, NY (US); Geoffrey Burr, Cupertino, CA (US); Yasuteru Kohda, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 700 days.

(21) Appl. No.: 17/701,308

(22) Filed: Mar. 22, 2022

(65) Prior Publication Data

US 2023/0305841 A1    Sep. 28, 2023

(51) Int. Cl.
*G06F 9/00* (2018.01)
*G06F 9/30* (2018.01)
*G06F 9/38* (2018.01)

(52) U.S. Cl.
CPC ...... *G06F 9/30038* (2023.08); *G06F 9/30032* (2013.01); *G06F 9/3877* (2013.01)

(58) Field of Classification Search
None
See application file for complete search history.

(56) References Cited

U.S. PATENT DOCUMENTS

| | | |
|---|---|---|
| 10,467,527 B1 | 11/2019 | Margaglia et al. |
| 10,733,039 B2 | 8/2020 | Torng et al. |
| 10,877,812 B2 | 12/2020 | Siegl et al. |
| 11,017,842 B2 | 5/2021 | Troia |
| 11,055,003 B2 | 7/2021 | Sun et al. |
| 11,081,149 B1 | 8/2021 | Park |
| 2020/0005127 A1 | 1/2020 | Baum et al. |
| 2020/0005902 A1* | 1/2020 | Mellen ............... C12Q 1/6869 |
| 2020/0133990 A1 | 4/2020 | Mathuriya et al. |
| 2020/0242459 A1 | 7/2020 | Manipatruni et al. |
| 2021/0019633 A1 | 1/2021 | Venkatesh |
| 2021/0264257 A1 | 8/2021 | Hu et al. |

(Continued)

FOREIGN PATENT DOCUMENTS

CN    110163478 A    *    8/2019    .........    G06Q 10/0635

OTHER PUBLICATIONS

Mishty et al., "Designing Efficient and High-Performance AI Accelerators with Customized STT-MRAM," IEEE Transactions on Very Large Scale Integration (VLSI) Systems, pp. 1-13, Apr. 2021.

(Continued)

*Primary Examiner* — Tuankhanh D Phan
(74) *Attorney, Agent, or Firm* — Kelsey M. Skodje

(57) ABSTRACT

Efficient data layout and alignment techniques for effectively executing AI workloads in wide-vector accelerator systems are provided. In one aspect, a method for processing AI workloads includes: logically dividing a data vector into a hierarchy of segments and sub-segments with each of the segments including more than one of the sub-segments, wherein each of the sub-segments includes words, and each of the words includes data-bits; and physically mapping the data-bits such that the words belonging to a same given one of the sub-segments are mapped contiguously across all of the segments. An AI accelerator system is also provided.

20 Claims, 19 Drawing Sheets

(56) References Cited

U.S. PATENT DOCUMENTS

2021/0266000 A1    8/2021  Ge
2023/0305841 A1*  9/2023  Jain ...................... G06N 3/0464

OTHER PUBLICATIONS

Hwang et al., "ASimOV: A Framework for Simulation and Optimization of an Embedded AI Accelerator," Micromachines, vol. 12, Issue 7, Jul. 19, 2021 (12 pages).
Yan et al., "iCELIA: A Full-Stack Framework for STT-MRAM-Based Deep Learning Acceleration," IEEE Transactions on Parallel and Distributed Systems, vol. 31, No. 2, pp. 408-422, Feb. 1, 2020.
Chi et al.; "PRIME: A Novel Processing-in-memory Architecture for Neural Network Computation in ReRAM-based Main Memory," ISCA ACM/IEEE 43rd Annual International Symposium on, Jun. 18-22, 2016 (13 pages).
Hussain et al.; "PVMC: Programmable Vector Memory Controller," ASAP IEEE 25th International Conference on Application-Specific Systems, Architectures and Processors, Jun. 18-20, 2014 (8 pages).
Mell et al., "The NIST Definition of Cloud Computing," NIST Special Publication 800-145, Sep. 2011 (7 pages).

* cited by examiner

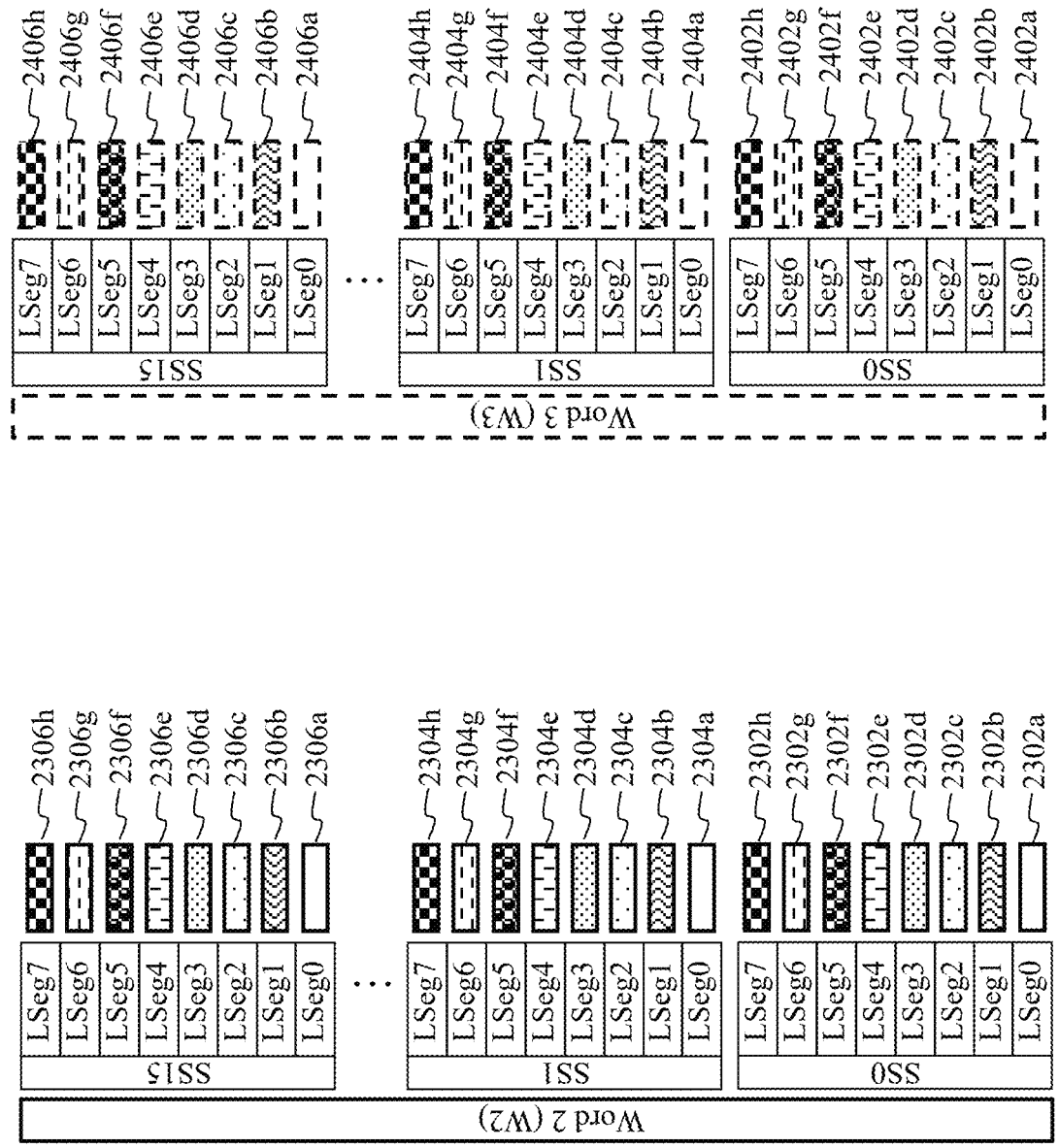

EFFICIENT DATA LAYOUT AND ALIGNMENT FOR WIDE-VECTOR ACCELERATOR SYSTEMS

FIELD OF THE INVENTION

The present invention relates to acceleration of artificial intelligence (AI) workloads, and more particularly, to efficient data layout and alignment techniques for effectively executing AI workloads in wide-vector accelerator systems.

BACKGROUND OF THE INVENTION

Artificial intelligence (AI) workloads such as deep learning are state-of-the-art in important applications such as natural language processing, speech analysis, and image classification. As such, hardware acceleration of AI workloads is of tremendous interest.

In-memory (Analog) accelerator systems that perform AI computations on wide vectors are promising for executing AI workloads efficiently and compactly. These in-memory accelerator systems can achieve performance and energy efficiency (e.g., greater than 100 Tera Operations Per Second (TOPS)/watt (W)) well beyond current state-of-the-art AI accelerators such as graphics processing units (GPUs). To achieve significantly high performance and energy efficiency, in-memory accelerator systems employ compute engines (e.g., analog crossbars designed using non-volatile memories), memory, and communication elements (i.e., on-chip memory and interconnects) that operate on wide vectors.

However, feeding wide vectors to the compute engines becomes a major design consideration and performance bottleneck. In particular, the data-elements needed to form input/output vectors are not always contiguous in memory, and oftentimes their physical locations in the on-chip memory do not align with the location at which they are needed at the compute engine. Multiplexing of data-elements within a wide vector is also very challenging (and inefficient) due to the physical distance of the on-chip memory modules.

One approach to mitigating this problem simply involves restricting the vector-width, i.e., design compute-engines, on-chip memory, and interconnects, to operate at a much smaller vector size. Decreasing the vector size greatly reduces the extent of the problem, and allows for the implementation of techniques such as zero-padding and data replication. However, a notable drawback to this approach is that it leads to significant memory wastage. Further, the amount of memory wastage increases with vector-size. Thus, at an extremely wide vector size the memory wastage could be very large. For instance, worst-case and typical wastage could be as high as 99% and 75%, respectively, for convolution neural networks at a vector size of 512.

Another approach is to design accelerators with one or more memory hierarchies, where high-level memory is accessed at a large block-size (e.g., 128 bytes (B)) granularity, while the lowest level memory is accessed at a much finer granularity (e.g., 8B, 16B, 32B, etc.). However, a notable drawback of this approach is that it is highly inefficient when accessing memory at the finer granularity. Thus, the fetching of required data-elements to form a wide vector can take many compute cycles.

Further, neither of the above-described approaches addresses the multiplexing problem that arises due to the large physical distance of the on-chip memory modules in wide-vector accelerators. As a result, multiplexing operations can be very expensive in terms of time and energy.

Therefore, improved techniques for processing AI workloads for a wide-vector accelerator system would be desirable.

SUMMARY OF THE INVENTION

The present invention provides efficient data layout and alignment techniques for effectively executing artificial intelligence (AI) workloads in wide-vector accelerator systems. In one aspect of the invention, a method for processing AI workloads is provided. The method includes: logically dividing a data vector (e.g., a row from memory) into a hierarchy of segments and sub-segments with each of the segments including more than one of the sub-segments, wherein each of the sub-segments includes words, and each of the words includes data-bits; and physically mapping the data-bits such that the words belonging to a same given one of the sub-segments are mapped contiguously across all of the segments.

In another aspect of the invention, an AI accelerator system is provided. The AI accelerator system includes: a memory; a compute engine connected to the memory; and a hardware logic unit configured to: pull a row from the memory, wherein the row is logically divided into a hierarchy of segments and sub-segments with each of the segments including more than one of the sub-segments, and each of the sub-segments including words, and each of the words including data-bits, and wherein the data-bits are physically mapped such that the words belonging to a same given one of the sub-segments are mapped contiguously across all of the segments; perform alignment operations on the segments, sub-segments or combinations thereof to create an aligned data vector; copy a portion of the aligned data-vector into a final output-vector, while selectively masking a remainder of the aligned data-vector; and transmit the final output-vector to the compute engine.

A more complete understanding of the present invention, as well as further features and advantages of the present invention, will be obtained by reference to the following detailed description and drawings.

BRIEF DESCRIPTION OF THE DRAWINGS

FIG. 23 is a diagram illustrating the Aligner-logic Vector Layout at a Word 2 (W2) according to an embodiment of the present invention;

FIG. 24 is a diagram illustrating the Aligner-logic Vector Layout at a Word 3 (W3) according to an embodiment of the present invention;

DETAILED DESCRIPTION OF PREFERRED EMBODIMENTS

Figure 1:
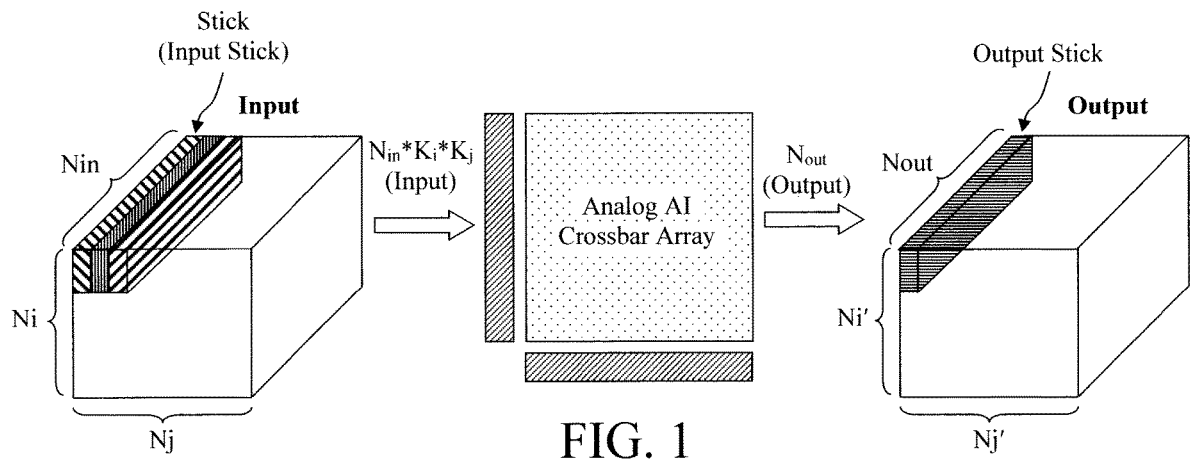
FIG. 1 is a diagram illustrating the processing of input and output data sticks by an analog artificial intelligence (AI) crossbar array according to an embodiment of the present invention.

As provided above, feeding wide data vectors to the compute engine of in-memory accelerator system can present some notable challenges. Namely, the data-elements needed to form input/output vectors are not always contiguous in memory, and their physical locations in the on-chip memory may not align with the location at which they are needed at the compute engine.

Advantageously, provided herein are efficient data layout and alignment techniques for executing artificial intelligence (AI) workloads in wide-vector accelerator systems, such as analog AI accelerators. As will be described in detail below, the present techniques provide a unique approach for encoding and mapping wide-vector data-elements to memory rows, whereby a memory row is logically divided into a hierarchy of logical segments (LSeg) and sub-segments (SS). The terms 'logical segment (LSeg)' and 'segment (Seg)' are used interchangeably herein. Within this hierarchy, each of the segments includes more than one of the sub-segments, each of the sub-segments includes multiple words (or data-elements), and each of the words includes multiple data-bits. Thus, the terms 'word' and 'data-element are' used interchangeably herein. The term 'data-bit' (or simply 'bit'), as used herein, generally refers to a logical unit of data, and the terms 'word' (or 'data-element') refer to a fixed-size collection of data-bits that are handled together.

As will be described in detail below, an exemplary wide data vector might include 512 words (data-elements) logically divided into 8 segments (Seg), i.e., Seg0 through Seg7, with each segment including 16 sub-segments (SS), i.e., SS0 through SS15, and each sub-segment including 4 words (W), i.e., W0 through W3. The unique identifier (address) for each of those 512 words is (segment Id, sub-segment id, word id), i.e., in this example 0≤word id≤3, 0≤sub-segment id≤15, 0≤segment Id≤7. The present techniques involve mapping the data-bits in such a way that an $M^{th}$ word (i.e., word id=M) from a $K^{th}$ sub-segment (i.e., sub-segment id=K) in a given one of the segments is mapped contiguously with (i.e., next to) the $M^{th}$ word (i.e., word id=M) from the $K^{th}$ sub-segment (i.e., sub-segment id=K) in each of the other segments. Namely, this occurs across all of the segments, i.e., words with identifiers (0, K, M), (1, K, M), (2, K, M), . . . , (7, K, M) are mapped contiguously. Thus, there is one $M^{th}$ word in every $K^{th}$ sub-segment. However, in the present example, there are 8 segments, and thus 8 such '$M^{th}$ word in every $K^{th}$ sub-segment.'

For instance, as will be described in detail below, the present techniques will entail mapping word-0 of sub-segment0 across all segments next to one another. Subsequently, word-0 of sub-segment1 across all segments are mapped next to one another. Then word-0 of sub-segment2 across all segments are mapped next to one another, and so on. Doing so advantageously minimizes the distance between the words of a particular one of the sub-segments across all of the segments, and also minimizes the distance between instances of a same given one of the words in each of the sub-segments across all of the segments. To read and/or write the mapped data-elements from/to memory, a unique hardware logic unit is described herein that is configured to perform a set of defined alignment operations of the data at the segment and/or sub-segment level. Accordingly, this hardware logic unit is also referred to herein as an 'Aligner Logic Unit.' As will be described in detail below, the segment and sub-segment level alignment operations performed by the Aligner Logic Unit include, but are not limited to, segment rotation and sub-segment shift, respectively.

The Aligner Logic Unit provides an aligner-logic friendly physical vector layout (also referred to herein simply as an 'Aligner-Logic Vector Layout') which can be provided as the input vector to a compute engine such as an analog AI crossbar array. As will be described in detail below, the analog AI crossbar array can include an arrangement of uniquely addressable resistive processing units (RPUs) that embody a neural network such as a convolutional neural network (CNN).

Similar to the so-called 'plasticity' of synaptic neurotransmitter connections that carry messages between biological neurons, the connections in a neural network that carry electronic messages between simulated neurons are provided with numeric weights that correspond to the strength or weakness of a given connection. The weights can be adjusted and tuned based on experience, making neural networks adaptive to inputs and capable of learning. For example, a CNN for image processing is defined by a set of input neurons which may be activated by the pixels of an input image. After being weighted and transformed by a function determined by the network's designer, the activations of these input neurons are then passed to other downstream neurons, which are often referred to as 'hidden' neurons. This process is repeated until an output neuron is activated.

Figure 2:
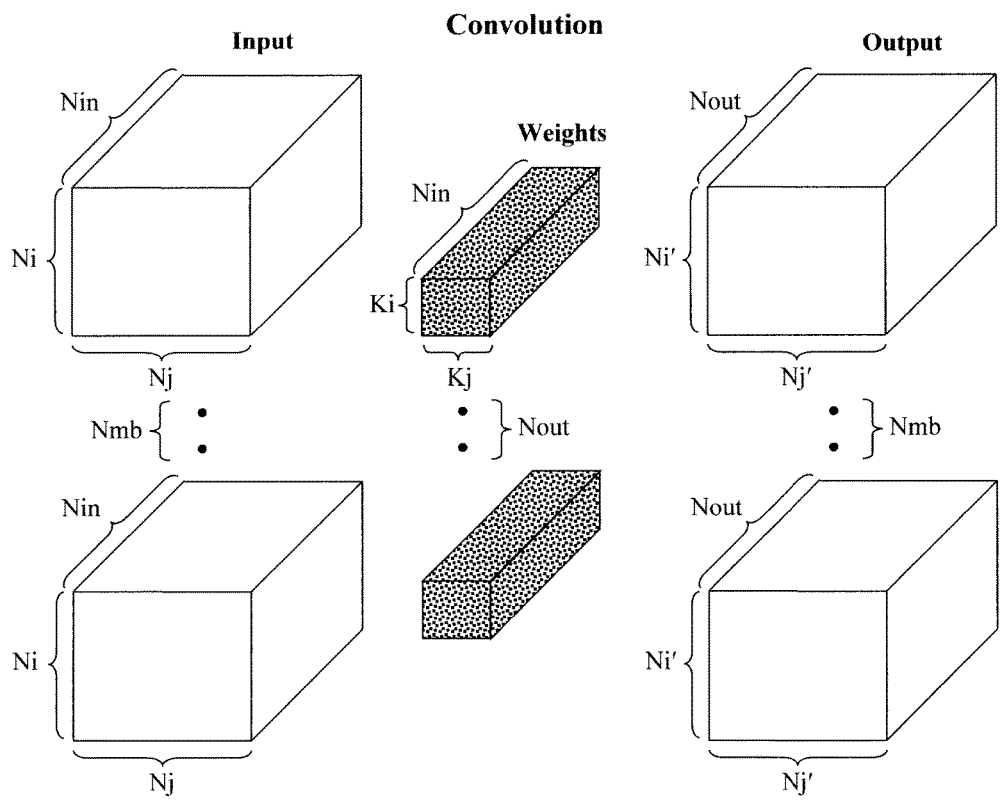
FIG. 2 is a diagram illustrating convolution operations according to an embodiment of the present invention.

Convolutional layers are the main building blocks of a CNN. Each convolutional layer processes input (e.g., input images) through a set of filters (or kernels) which apply a convolution operation to the input images. The results are then passed to the next layer in the CNN, and so on. As shown in FIG. 1 for instance, each convolutional layer consumes an incoming intermediate image with $N_{in}$ input-planes, each input-plane containing $N_i$ by $N_j$ pixels (see 3D 'Input' tensor), and produces an outgoing intermediate image with $N_{out}$ output-planes, each output-plane containing $N_i'$ by $N_j'$ pixels (see 3D 'Output' tensor). Referring briefly to FIG. 2, it can be seen that the outgoing intermediate image is produced by convolving a set of $N_{out}$ filter kernels, each $N_{out}$ filter kernel containing, e.g., $N_{in}$ by $K_i$ by $K_j$ pixels, across the incoming intermediate image.

Given the local nature of the convolution filter kernels, each output pixel in the outgoing intermediate image requires only a finite amount of data. The $N_{in}$ incoming activation elements that share the same $K_i$ and $K_j$ filter kernel values are referred to herein as a 'stick of data,' 'data stick,' or simply 'stick.' See, for example, the 'Input Stick' and 'Output Stick' labeled in FIG. 1.

Producing the output pixel for ONE of the $N_{out}$ filter kernels requires taking the outer-product between this Input Stick of activation values from the incoming intermediate image and the kernel-weight vector of same length ($N_{in}$ elements) matching that same $K_i$ and $K_j$ value, and then aggregating across all $K_i$ and $K_j$ values (typically $K_i$ and $K_j$ are either 3, 5, or 7). Thus, producing an output pixel in the outgoing intermediate image requires $K_i*K_j$ input sticks (representing pixels or activation values from the incoming intermediate image) and an identical length kernel-weight vector (representing the 3D kernel tensor of size $N_{in}*K_i*K_j$ rearranged into a 1D vector).

This operation can be performed on a single column integration in the Analog AI crossbar array. By arranging the $N_{out}$ different kernels on neighboring columns, a single output stick (see 'Output Stick' in FIG. 1) can be produced, again representing all of the output filter values for a given single pixel within the outgoing intermediate image. This $K_i$ by $K_j$ stick-in, 1-stick-out operation can then be performed across all of the pixels in the outgoing intermediate image in order to implement the convolution operation, not by convolving the weight kernel across the image, but instead by re-arranging and aligning the elements of the incoming intermediate image across the stationary weight matrix stored in the Analog AI crossbar array.

The above-described convolution process, however, presents some notable challenges. For instance, each data stick is needed up to $K_i$ by $K_j$ different times for different integrations. Furthermore, each time a data stick arrives at the Analog AI crossbar array, it is needed on different rows (e.g., addressing different kernel weight elements), and may be used in combination with different neighboring data sticks. See, for example, FIGS. 3A and 3B.

Figure 3A:
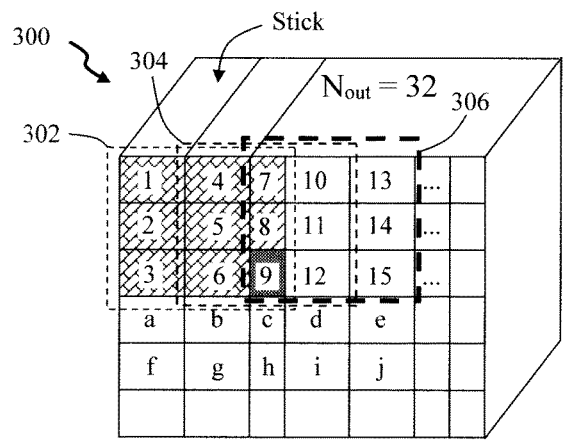
FIG. 3A is a diagram illustrating data stick reuse during convolution according to an embodiment of the present invention.
Figure 3B:
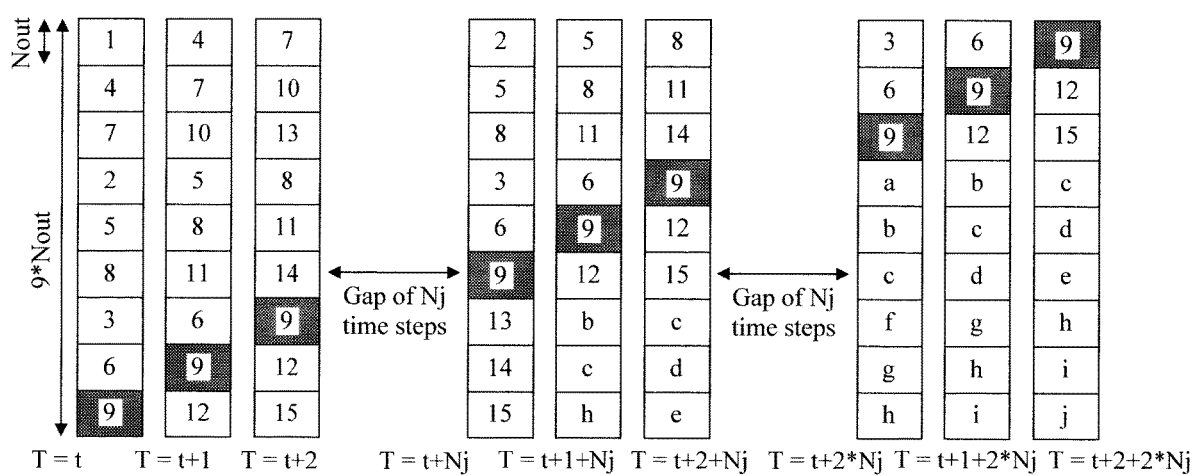
FIG. 3B is a diagram illustrating data sticks being reused at different time steps at different locations according to an embodiment of the present invention.

FIG. 3A illustrates a 3D input tensor 300 which, as described above, serves as input to the Analog AI crossbar array for convolution. As shown in FIG. 3A, 3D input tensor 300 contains data sticks 1, 2, 3, etc. Each of these data sticks is needed up to $K_i$ by $K_j$ different times for different integrations at different locations in the Analog AI crossbar array. For instance, the $N_{out}$ shown in FIG. 3B for various time windows 302, 304, 306, etc. (see FIG. 3A) illustrates how the location of the data sticks can change for different time steps (T). For instance, time steps T=t, T=t+1 and T=t+2 correspond to the windows 302, 304 and 306, respectively. At time step T=t, the data sticks are processed in the order of 1, 4, 7, 2, 5, 8, 3, 6, 9 based on window 302. Shifting to window 304, at time T=t+1 the data sticks are processed in the order of 4, 7, 10, 5, 8, 11, 6, 9, 12. Shifting next to window 306, at time T=t+2 the data sticks are processed in the order of 7, 10, 13, 8, 11, 14, 9, 12, 15. As shown in FIG. 3B, the same scenario occurs at times steps T=t+Nj, T=t+1+Nj, T=t+2+Nj and T=t+2*Nj, T=t+1+2*Nj, T=t+2+2*Nj.

Looking at data stick 9 for example, this data stick is reused at each of the time steps shown, and at each of the time steps T the location of data stick 9 is different. For instance, it can be seen that data stick 9 is needed in a different row of the analog AI crossbar array at time step T=t as compared to time step T=t+1. The same is true going from time step T=t+1 to time step T=t+2, and so on. However, in terms of reuse, once a data stick is no longer needed its storage space should be freed and made available for other sticks in order to use storage space wisely.

Advantageously, the present Aligner Logic Unit stores incoming data stick-vectors as they are produced, and performs alignment operations on those data stick-vectors for transmittal to the analog AI crossbar array in order to implement convolution operations efficiently. The Aligner Logic Unit uses only the minimum amount of storage space required.

With respect to the operations at the analog AI crossbar array, techniques are also provided herein for re-arranging the weights (operands) in the analog AI crossbar array to achieve alignment using the set of defined alignment operations. Namely, as will be described in detail below, valid-zero interleaving mapping is employed across rows and/or columns of the analog AI crossbar array to achieve alignment for convolutions.

Figure 4:
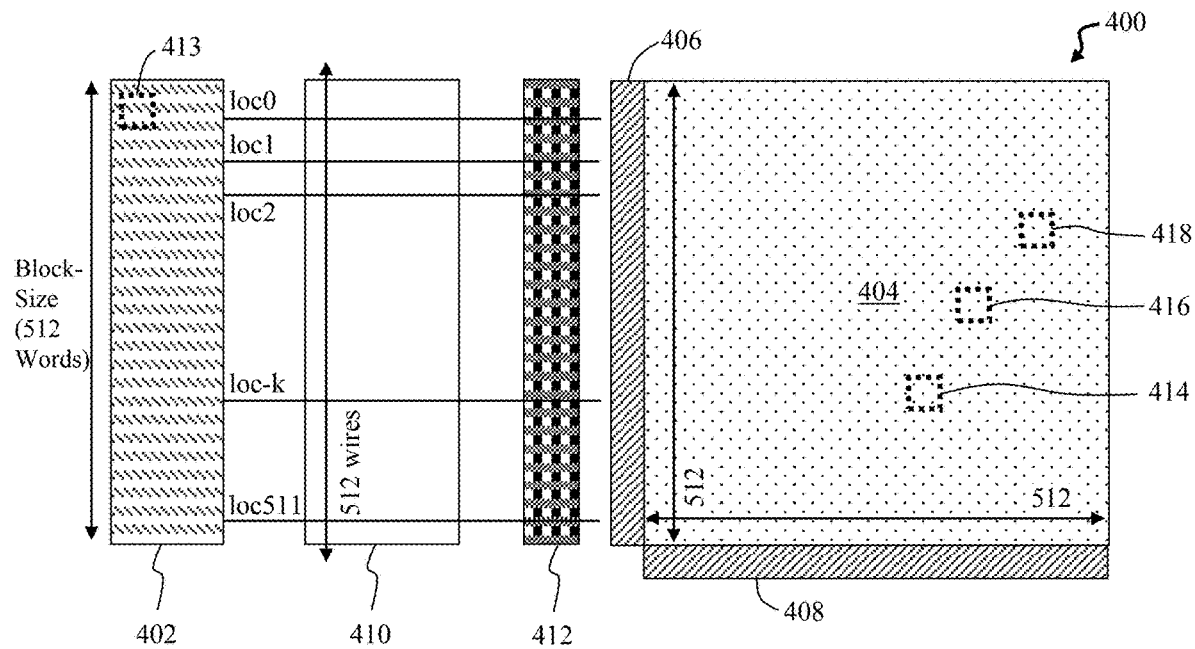
FIG. 4 is a diagram illustrating an exemplary wide-vector analog AI accelerator system according to an embodiment of the present invention.

Given the above overview, FIG. 4 is a diagram illustrating an exemplary wide-vector analog AI accelerator system 400 in accordance with the present techniques. As shown in FIG. 4, system 400 includes a memory 402 and a compute engine 404. An input register 406 and an output register 408 deliver input and output signals to/from compute engine 404, respectively. According to an exemplary embodiment, memory 402 is a random access memory (RAM) such as static random access memory (SRAM). For high efficiency, system 400 performs computation, memory-access and data-transfer operations on wide data vectors, namely those having a vector size greater than or equal to 512. Thus, for illustrative purposes only, memory 402 is organized into blocks of 512 words in the present example.

Figure 5:
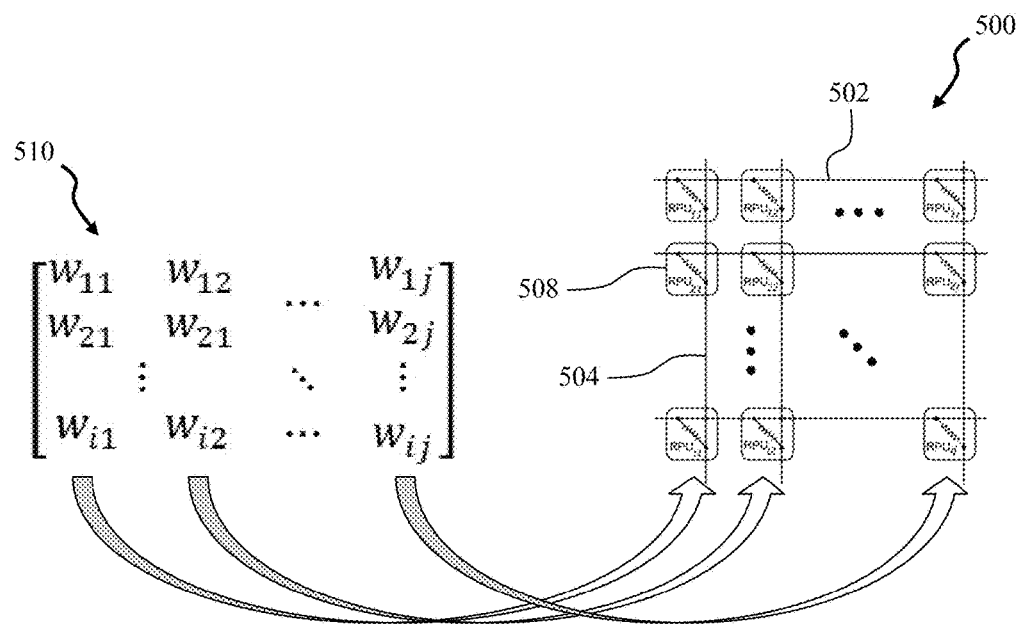
FIG. 5 is a diagram illustrating an analog AI crossbar array of resistive processing unit (RPU) devices according to an embodiment of the present invention.

According to an exemplary embodiment, compute engine 404 is an analog AI crossbar array of resistive processing units (RPUs). See, for example, FIG. 5. Namely, FIG. 5 is a diagram illustrating an exemplary analog AI crossbar array 500 that can be implemented as compute engine 404 in accordance with the present techniques. As shown in FIG. 5, analog AI crossbar array 500 has a series of conductive row wires 502 and a series of conductive column wires 504 oriented orthogonal to, and intersecting, the conductive row wires 502. The intersections of the conductive row wires 502 and column wires 504 are separated by RPU devices 508 forming the analog AI crossbar array 500 of RPU devices 508. By way of example only, each RPU device 508 can include a first terminal, a second terminal and an active region. A conduction state of the active region identifies a weight value of the RPU device 508, which can be updated/adjusted by the application of a signal to the first/second terminals. Further, three-terminal (or even more terminal) devices can serve effectively as two-terminal resistive memory devices by controlling the extra terminals.

Each RPU device 508 ($RPU_{ij}$) is uniquely identified based on its location in the $i^{th}$ row and $j^{th}$ column of the analog AI crossbar array 500. For instance, going from the top to bottom, and from the left to right of analog AI crossbar array 500, the RPU device 508 at the intersection of the first row wire 502 and the first column wire 504 is designated as $RPU_{11}$, the RPU device 508 at the intersection of the first row wire 502 and the second column wire 504 is designated as $RPU_{12}$, and so on.

As shown in FIG. 5, each weight parameter $w_{ij}$ of an algorithmic (abstract) weight matrix 510 is physically mapped on hardware to a single one of the RPU devices ($RPU_{ij}$) 508 in analog AI crossbar array 500. The mapping of the weight parameters in weight matrix 510 to the RPU devices 508 in analog AI crossbar array 500 follows the same convention as above. Namely, weight $w_{i1}$ of weight matrix 510 is mapped to $RPU_{i1}$ of analog AI crossbar array 500, weight $w_{i2}$ of weight matrix 510 is mapped to $RPU_{i2}$ of analog AI crossbar array 500, and so on.

As highlighted above, the RPU devices 508 of analog AI crossbar array 500 can function as the weighted connections between neurons in a neural network such as a CNN for image processing. The resistance of the RPU devices 508 can be altered by controlling the voltages applied between the individual row wires 502 and column wires 504. Altering the resistance is how data is stored in the RPU devices 508 based, for example, on a high resistance state or a low resistance state. The resistance state of the RPU devices 508 is read by applying a voltage and measuring the current that passes through the target RPU device 508. All of the operations involving weights are performed fully in parallel by the RPU devices 508.

Referring back to FIG. 4, in one exemplary embodiment the compute engine 404 is an analog AI crossbar array with a size of 512×512 (or larger), meaning that one crossbar consumes a vector of size 512 and produces a vector of size 512. As highlighted above, operations are performed fully in parallel within the analog AI crossbar array. Thus, with a crossbar size of 512×512, read and write operations can be performed at 512 words in parallel, which is highly efficient.

Interconnect 410 is used to generally represent the (e.g., 512) wires linking memory 402 and compute engine 404. The illustration of a wide interconnect 410 in the present example helps to highlight the challenges associated with sending wide data vectors to the compute engine 404. Namely, it is often the case that the physical locations (e.g., Loc0, Loc1, Loc2, . . . , Loc511) of the data-elements in memory 402 do not align with the location at which they are needed at the compute engine 404. For instance, the above-described data sticks are stored in at least one row of the memory 402. As highlighted above, each of these data sticks is needed up to $K_i$ by $K_j$ different times for different integrations, and each time one of the data sticks arrives at the Analog AI crossbar array it may be needed on different rows of the Analog AI crossbar array.

This concept is illustrated schematically in FIG. 4. For instance, a given data-element may be present at location 413 in memory 402. While the locations of the data-elements in memory 402 do not change, that same given data-element may be needed for different integrations at different locations 414, 416 and 418 in the Analog AI crossbar array.

Advantageously, imposing the present hierarchy of segments and sub-segments on the rows of memory 402, mapping the data stick-vectors to those segments and sub-segments, and then using alignment operations to optimize the data-layout serves to minimize the maximum distance across the words/sub-segments of different segments. As shown in FIG. 4, system 400 includes a hardware Aligner Logic Unit 412 that performs a defined set of the alignment operations of the segments and/or sub-segments (such as segment rotation and sub-segment shift) to provide an aligned Aligner-Logic Vector Layout for transmittal to the compute engine 404.

Figure 6:
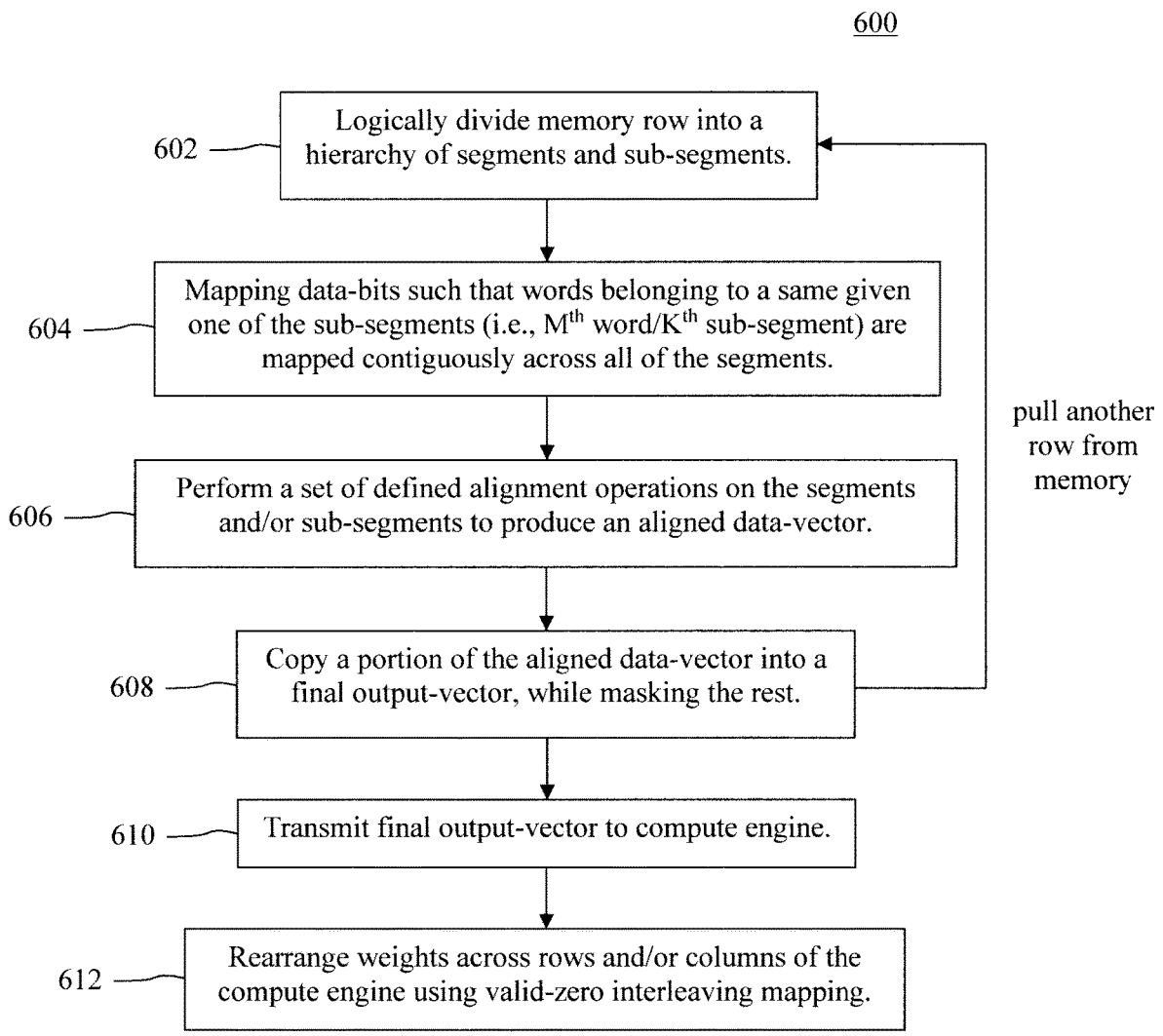
FIG. 6 is a diagram illustrating an exemplary methodology for processing AI workloads in a wide-vector accelerator system such as the system of FIG. 4 according to an embodiment of the present invention.

In accordance with the present techniques, FIG. 6 is a diagram illustrating an exemplary methodology 600 for processing AI workloads in a wide-vector analog AI accelerator system such as system 400 of FIG. 4. As previously noted, the above-described data sticks are stored in at least one row of the memory 402. More specifically, according to an exemplary embodiment memory 402 is an SRAM capable of storing, e.g., 512 data-elements per row. In that case, each row of memory 402 will store either: a) one entire data stick if that data stick has 512 data-elements, b) a portion of a really long data stick that has more than 512 data-elements, or c) multiple small data sticks each having less than 512 data-elements. It is notable that, while methodology 600 will be described in the context of processing an AI workload from memory (i.e., a memory row), the present techniques are more generally applicable to any wide data vector that can be arranged in an Aligner-Logic Vector Layout, not just memory rows. Take, for instance, a wide data vector coming from somewhere other than memory, such as from the compute engine 404. As highlighted above, according to an exemplary embodiment the term 'wide data vector' is used herein to refer to a data vector having a size of greater than or equal to 512 data-elements (words).

Figure 7:
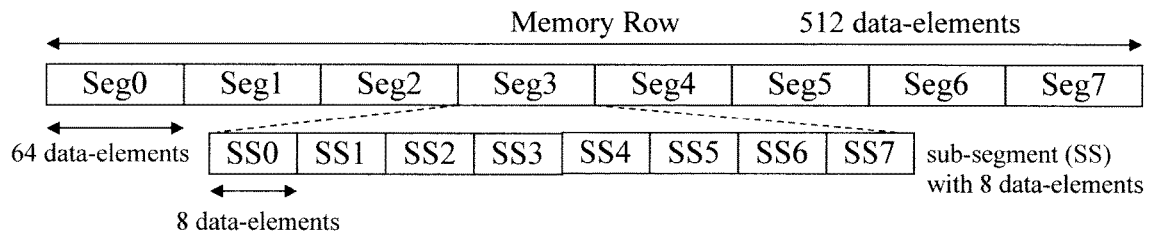
FIG. 7 is a diagram illustrating a row in memory having been logically divided into segments and sub-segments according to an embodiment of the present invention.

Thus, in step 602, one of those rows in memory 402 is first logically divided into two hierarchies, segments and sub-segments. Namely, that row in memory 402 is divided into multiple segments, and each of the segments is further divided into multiple sub-segments (with each of the sub-segments including multiple words, and each of the words including multiple data-bits as described above). For instance, referring briefly to FIG. 7, a row in memory 402 (labeled "Memory Row") having 512 data-elements is shown having been divided into multiple (e.g., eight) logical segments, i.e., Seg0 through Seg7, with each segment (Seg) containing 64 data-elements. Each segment, i.e., Seg0 through Seg7, is further subdivided into multiple (e.g., eight) sub-segments, i.e., SS0 through SS7, with each sub-segment (SS) containing 8 data-elements. Thus, in the present example, there are eight segments (Seg) per row, and eight sub-segments (SS) per segment. While the sub-segments of only one of the segments are shown in FIG. 7, it is to be understood that each of the segments Seg0 through Seg7 similarly contains eight sub-segments SS0 through SS7.

It is notable that data is not handled individually at a level smaller than a sub-segment. Thus, as will be described in detail below, alignment operations such as rotating are performed at the segment level, and shifting are performed at the sub-segment level. However, no alignment operations are performed on data at a granularity finer than at the sub-segment level. Further, as provided above each row of memory 402 can store multiple small data sticks (e.g., each having less than 512 data-elements). In that case, it is notable that small data sticks are always broken up in powers of 2. For instance, small data sticks are only divided over 1, 2, 4 or 8 segments, or over 1, 2, 4 or 8 sub-segments.

Referring back to FIG. 6, in step 604 the data-bits are mapped such that the words belonging to a same given one of the sub-segments (i.e., the $M^{th}$ word from a $K^{th}$ sub-segment in each of the segments—see above) are mapped contiguously across all of the segments. As highlighted above, mapping the data-bits in this manner advantageously minimizes the distance between the words of a particular one of the sub-segments across all of the segments, and also minimizes the distance between instances of a same given one of the words in each of the sub-segments across all of the segments. This mapping scheme advantageously optimizes the present data layout in order to maximize the efficiency of segment-level rotations (i.e., the more common operation) and/or sub-segment-level shifts as described in detail below, and enables the interleaving of words of logical segments across physical segments as also described in detail below.

Namely, hardware Aligner Logic Unit 412 pulls a row from the memory 402 and in step 606 performs a set of defined alignment operations on the segments and/or sub-segments in that row. For instance, one alignment operation that can be performed by Aligner Logic Unit 412 in step 606 is a segment-level rotation. With segment-level rotation, the segments in the row are rotated clockwise (i.e., rotated to the right) or counter-clockwise (i.e., rotated to the left) by at least one segment. The terms 'rotation' and 'clockwise/counter-clockwise' are used to indicate that, during this alignment operation, any data-elements that shift 'too far' will be 'rotated' and will safely appear at the other end of the vector.

Figure 8:
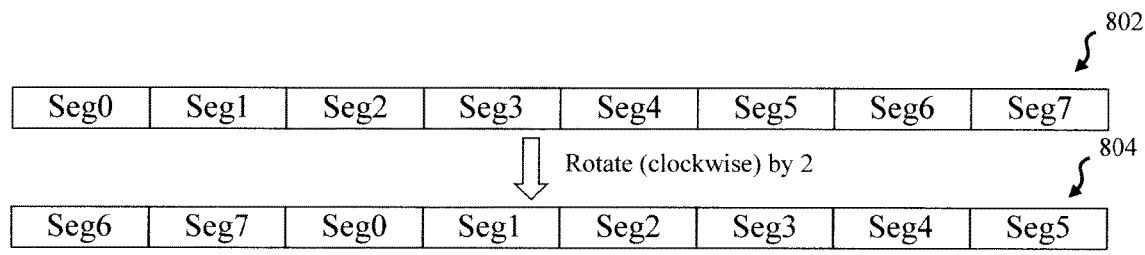
FIG. 8 is a diagram illustrating an example of segment-level rotation according to an embodiment of the present invention.

For illustrative purposes only, FIG. 8 is a diagram depicting a non-limiting example of a segment-level rotation being performed on the memory row from FIG. 7. In this particular example, the segments in the memory row are being rotated clockwise (i.e., rotated to the right) by two segments. Namely, as shown in FIG. 8, the vector prior to rotation 802 appears as it does in FIG. 7 with, from left to right, Seg0 being the first segment and Seg7 being the last segment in the vector 802. However, in the vector following a clockwise rotation by 2 segments 804, the data-elements have been reorganized with, from left to right, Seg6 being the first segment and Seg5 being the last segment in the vector 804.

This example in FIG. 8 illustrates the above-described concept of how data-elements that are shifted too far are rotated to the other end of the vector. For instance, looking at the positioning of Seg0 through Seg5 in vector 802 versus that in vector 804, these segments have simply been rotated 2 places to the right. However, with regard to the positioning of Seg6 and Seg7 in vector 802 versus that in vector 804, this operation has shifted these segments too far. Thus, Seg6 and Seg7 have been rotated to the other (left) end of the vector 804. As will be described in detail below, by contrast, with a sub-segment-level shift any data-elements that shift 'too far' will disappear. It is notable that the scenario depicted in FIG. 8 is intended merely to illustrate only one of the segment-level rotation operations contemplated herein. For instance, the rotation operations can be performed to rotate the segments clockwise or counter-clockwise by more or fewer segments than shown, including instances where the segments are rotated by one segment.

These segment-level rotation operations can be physically implemented in the data pulled from the given row in memory 402 simply by making a large number of highly-localized shifts. For instance, to rotate the data left (or right) by one segment, one needs only to move each physical data-element by one position, or 10 bits when there are 8 segments and 10-bits per data-element. To make sure that this operation affects all segments, this shift must be done for each sub-segment and each data-element within that sub-segment.

Another alignment operation that can be performed by Aligner Logic Unit 412 in step 606 is a sub-segment-level shift. It is notable that segment-level rotation and/or sub-segment-level shift alignment operations can be performed by Aligner Logic Unit 412 as needed for any given row pulled from memory 402. With sub-segment-level shift, the sub-segments in the row are shifted left or right by at least one sub-segment. By comparison with the segment-level rotations described above, these sub-segment-level shifting operations that shift a sub-segment(s) too far to the left or right will cause that sub-segment(s) to disappear, i.e., there is no rotation to the other end of the row as with segment-level rotation.

Figure 9A:
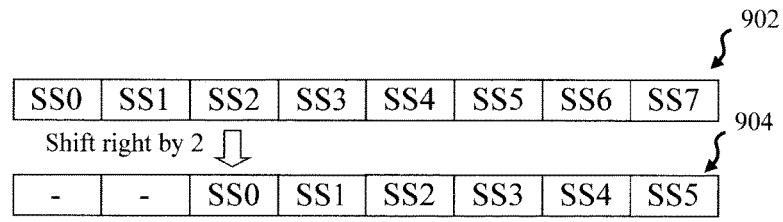
FIG. 9A is a diagram illustrating an example of sub-segment-level shifting according to an embodiment of the present invention.
Figure 9B:
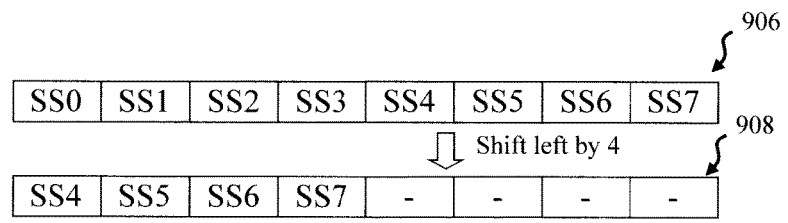
FIG. 9B is a diagram illustrating another example of sub-segment-level shifting according to an embodiment of the present invention.

For illustrative purposes only, FIGS. 9A and 9B are diagrams depicting non-limiting examples of sub-segment-level shifting operations being performed on the sub-segments shown in FIG. 7. In the example depicted in FIG. 9A, the sub-segments are being shifted right by 2 sub-segments. Namely, as shown in FIG. 9A, the sequence of sub-segments 902 appears as it does in FIG. 7 with, from left to right, SS0 being the first sub-segment and SS7 being the last sub-segment in the sequence 902. However, in the sequence following a shift right by 2 sub-segments 904, SS5 is now the last sub-segment in the sequence 902. Namely, as highlighted above, with a sub-segment-level shift any data-elements that shift 'too far' will disappear. In this particular example, SS6 and SS7 (the two sub-segments at the right end of the sequence) disappear after the shift right by 2 sub-segments, and sub-segment SS0 is preceded by 2 void sub-segments (as indicated by dashes).

In another example that is depicted in FIG. 9B, the sub-segments are being shifted left by 4 sub-segments. Namely, as shown in FIG. 9B, the sequence of sub-segments 906 appears as it does in FIG. 7 with, from left to right, SS0 being the first sub-segment and SS7 being the last sub-segment in the sequence 906. However, in the sequence following a shift right by 4 sub-segments 908, SS4 is now the first sub-segment in the sequence 908. Namely, as highlighted above, with a sub-segment-level shift any data-elements that shift 'too far' will disappear. In this particular example, SS0, SS1, SS2 and SS3 (the four sub-segments at the left end of the sequence) disappear after the shift right by 4 sub-segments, and sub-segment SS7 is followed by 4 void sub-segments (as indicated by dashes).

It is notable that the scenarios depicted in FIG. 9A and FIG. 9B are intended merely to illustrate only two of the sub-segment-level rotation operations contemplated herein. For instance, the shifting operations can be performed to shift the sub-segments left or right by more or fewer sub-segments than shown, including instances where the sub-segments are shifted by only a single segment. Further, it is to be understood that other alignment operations at the segment and/or sub-segment level such as sub-segment level rotations can also be implemented as needed in accordance with the present techniques.

As highlighted above, the sub-segment shifts can be implemented in concert with the above-described segment-level rotations. For instance, a segment level rotation can be performed to shift the segments by 1, 2, 3, etc. segments, followed by a sub-segment level shift to the sub-segments in at least one of the segments by 1, 2, 3, etc. sub-segments.

However, as will be described in detail below, there are instances where a segment-level rotation is sufficient to achieve alignment, which is ideal. Namely, to shift the data-elements left or right by one sub-segment position requires a slightly larger move than rotating the segments by one segment. For instance, a sub-segment shift requires the movement of 80-bits when there are 8 segments and 10-bits per data-element (eight times larger than the segment rotation—see above).

Performing the above-described alignment operations on the raw data from a row pulled from memory 402 (i.e., rotating the row by some number of segments and/or shifting the row by some number of sub-segments) produces what is referred to herein as an 'aligned data-vector.' In order to build a final output vector for transmittal to the Analog AI crossbar array, it is often the case that data sticks need to be pulled from multiple rows in memory 402 and combined/aligned. The alignment operations should only be applied to the segments and sub-segments that need them. This can be accomplished using selective bit masking. For instance, where mask-bits are zero, the previous contents of the output-vector register remain unchanged, e.g., from data-element values (bits) stored in the output register. Then, once the raw data from a given row in memory 402 has been rotated/shifted, it will be transferred into the output register only if the appropriate mask-bit within both the segment mask-register and the sub-segment mask-register are selectively set. Namely, if either mask-bit is zero, then the final output-vector register should remain unchanged. For example, as highlighted above, some operations require only segment-level alignment operations. During those segment-level operations the sub-segment bit mask will be all 1.

Thus, according to an exemplary embodiment, in step 608 the Aligner Logic Unit 412 copies a portion of the aligned data-vector into a final output-vector, while selectively masking a remainder of the aligned data-vector. As provided above, where the mask-bits are zero, the previous contents of the final output-vector register remain unchanged. Basically, the stored bit states (1 or 0) across masked data-elements are retained. For instance, the previous content could be zero if the last operation on the output register was a reset or clear operation, or the previous content could be the value of a previous aligned row (i.e., the aligned vector in the last iteration).

As shown in FIG. 6, another row is pulled from memory 402, and steps 602-608 are repeated using the raw data from that row. The process is repeated as needed iteratively over multiple other rows in memory 402.

In step 610, the final output-vector is transmitted to the compute engine 404, i.e., analog AI crossbar array. In step 612, the weights (operands) across the rows and/or columns of the analog AI crossbar array are rearranged using valid-zero interleaving mapping in order to efficiently utilize the aligned data.

An important aspect of the present techniques is the inverted relationship between the logical and physical organization of the data-elements. Namely, regarding the logical organization of the data-elements, each data stick is a continuous vector of the data-elements within multiple segments of a row(s) in memory 402, with each of the segments containing multiple sub-segments. By contrast, the physical organization of the data-elements is such that the data-elements from different data sticks that share the same sub-segment and the same 'element-number' within that sub-segment (e.g., data-element 1 of 4) will sit in ordered proximity of their segment number. This physical organization of the data-elements makes it possible to rotate all of the data-elements in all of the segments by making a large number of highly-localized shifts and/or shift the data-elements by one or more sub-segments. These segment-level and sub-segment-level alignment operations were described in detail above.

Figure 10:
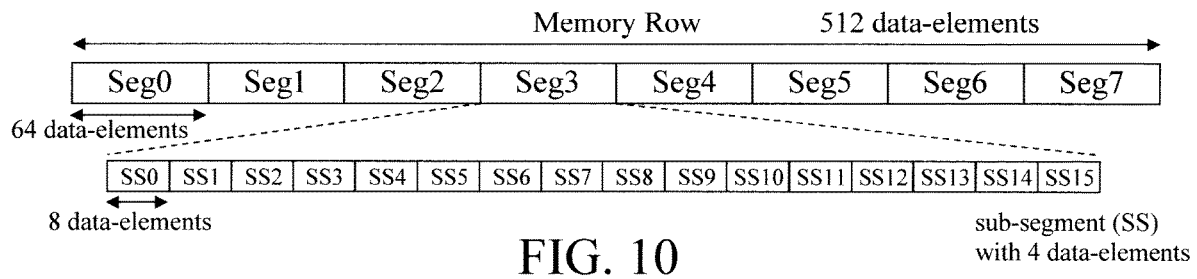
FIG. 10 is a diagram illustrating an example of a memory row having been divided into 8 segments, and each segment having been divided into 16 sub-segments according to an embodiment of the present invention.
Figure 11:
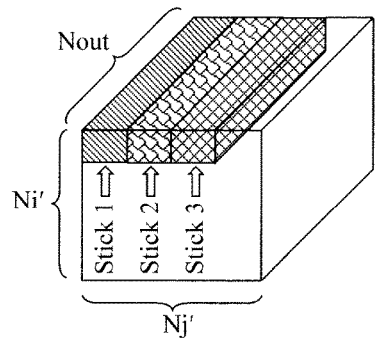
FIG. 11 is a diagram illustrating an example of data sticks to be mapped to the segments and/or sub-segments of FIG. 10 according to an embodiment of the present invention.
Figure 12:
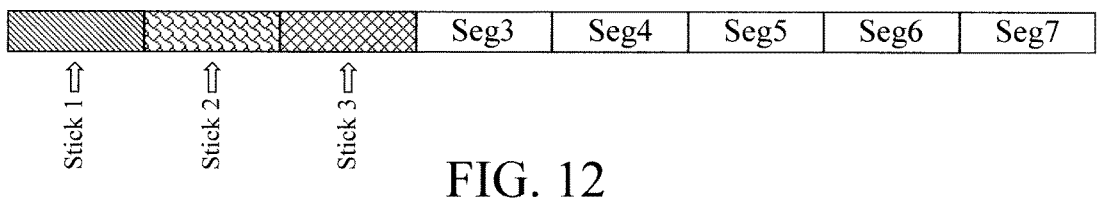
FIG. 12 is a diagram illustrating an example of data stick mapping to the memory row of FIG. 10 where each data stick occupies 1 segment according to an embodiment of the present invention.

Some non-limiting examples of data-stick (logical) mapping to the segments and sub-segments of a row in memory 402 are now described by way of reference to FIGS. 10-19. In these examples, memory 402 is capable of storing 512 data-elements per row. Thus, each row of memory 402 will store either: a) one entire data stick if that data stick has 512 data-elements, b) a portion of a really long data stick that has more than 512 data-elements, or c) multiple small data sticks each having less than 512 data-elements. Further, as shown in FIG. 10, each row is divided into 8 logical segments, Seg0 through Seg7 (each segment having a width of 64), and each segment is divided into 16 sub-segments, SS0 through SS15 (each sub-segment having a width of 4). As shown in FIG. 11, each example will involve the mapping of three data sticks, Stick 1, Stick 2 and Stick 3, to these segments and/or sub-segments.

A first set of the present examples illustrates situations where the data stick size is greater than or equal to (≥) the segment width. Thus, in the first set of examples, the data stick is mapped to one or more segments. In that case, segment-level rotations (see above) are sufficient for alignment. Namely, referring to FIG. 12, an example is depicted where $N_{out}$ is 64 data-elements. As provided above, each segment has a width of 64. Thus, in this example the data stick size is 64 and, in the data stick mapping shown in FIG. 12, each of Stick 1, Stick 2 and Stick 3 occupies 1 segment.

Figure 13:
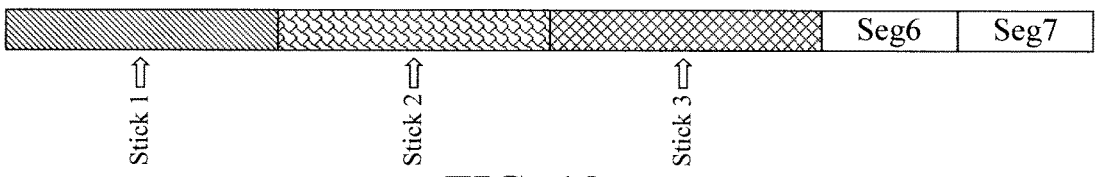
FIG. 13 is a diagram illustrating an example of data stick mapping to the memory row of FIG. 10 where each data stick occupies 2 segments according to an embodiment of the present invention.

Referring to FIG. 13, an example is depicted where the $N_{out}$ is 128 data-elements. As provided above, each segment has a width of 64. Thus, in this example the data stick size is 128 and, in the data stick mapping shown in FIG. 13, each of Stick 1, Stick 2 and Stick 3 occupies 2 segments.

Figure 14:
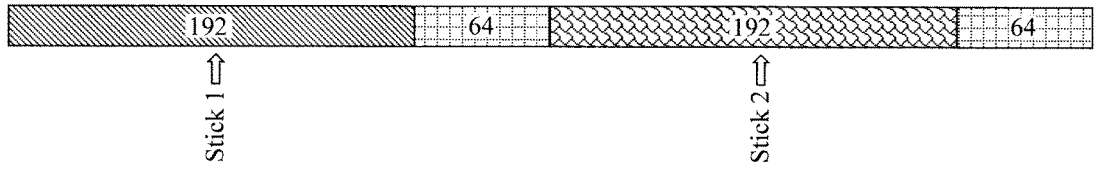
FIG. 14 is a diagram illustrating an example of data stick mapping to the memory row of FIG. 10 where each data stick occupies 4 segments with zero padding according to an embodiment of the present invention.

As provided above, data sticks are always broken up in powers of 2. Namely, data sticks are only divided over 1, 2, 4, 8, etc. segments, or over 1, 2, 4, 8, etc. sub-segments. With that in mind, FIG. 14 depicts an example where the $N_{out}$ is 192 data-elements. As provided above, each segment has a width of 64. Thus, the data sticks in this example are too large to be divided over 2 segments (192/64=3), and thus must be divided over 4 segments since the data sticks are always broken up in powers of 2. As such, (64) zeros are used to pad the segments making the data stick size 256 (192 valids+64 zeros) and, in the data stick mapping shown in FIG. 14, each of Stick 1 and Stick 2 occupies 4 segments. In this example, Stick 3 would occupy 4 segments in another row (not shown).

Figure 15:
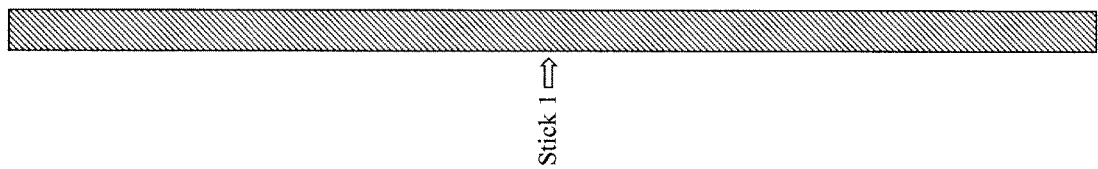
FIG. 15 is a diagram illustrating an example of data stick mapping to the memory row of FIG. 10 where each data stick occupies 1 row according to an embodiment of the present invention.
Figure 16:
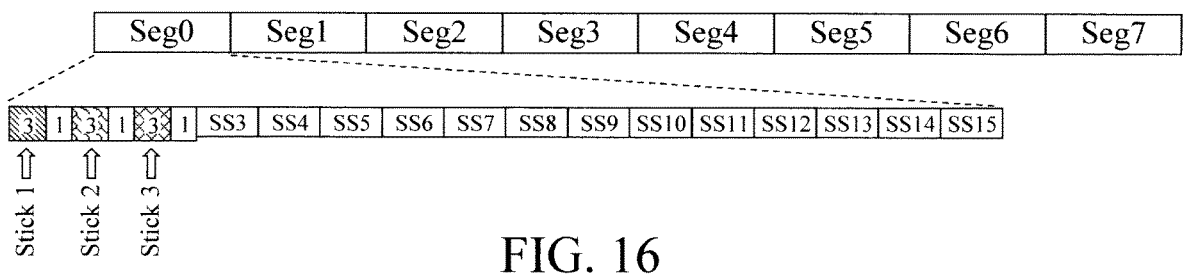
FIG. 16 is a diagram illustrating an example of data stick mapping to the memory row of FIG. 10 where each data stick occupies 1 sub-segment with zero padding according to an embodiment of the present invention.

Referring to FIG. 15, an example is depicted where the $N_{out}$ is 512 data-elements. As provided above, each segment has a width of 64. Thus, in this example the data stick size is 512 and, in the data stick mapping shown in FIG. 15, each data stick occupies 8 segments or 1 entire row. While only Stick 1 is shown in FIG. 15, it is to be understood that Stick 2 and Stick 3 would appear the same in other rows.

In a second set of the examples, situations are illustrated where the data stick size is less than the segment width, requiring that the data sticks be mapped to the sub-segments. In that case, both segment-level rotations and sub-segment-level shifts (see above) are needed for alignment. Namely, referring to FIG. 16, an example is depicted where $N_{out}$ is 3 data-elements. As provided above, each sub-segment has a width of 4. Thus, the data sticks in this example are smaller than a sub-segment. As such, (1) zero is used to pad the sub-segments making the data stick size 4 (3 valids+1 zero) and, in the data stick mapping shown in FIG. 16, each of Stick 1, Stick 2 and Stick 3 occupies 1 sub-segment.

Figure 17:
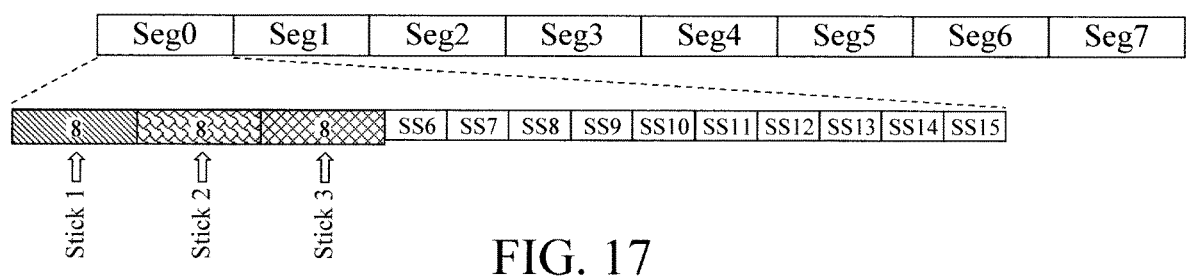
FIG. 17 is a diagram illustrating an example of data stick mapping to the memory row of FIG. 10 where each data stick occupies 2 sub-segments according to an embodiment of the present invention.
Figure 18:
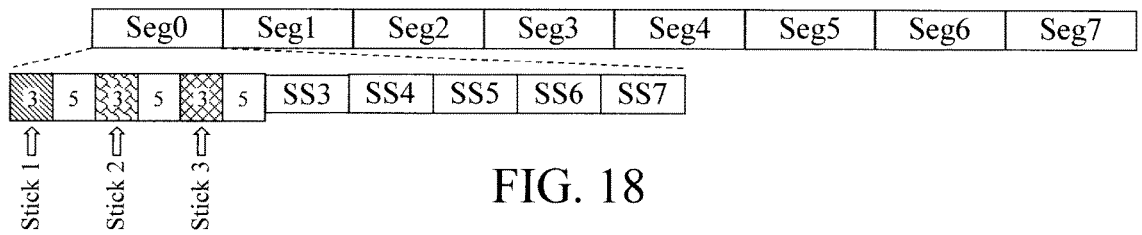
FIG. 18 is a diagram illustrating an example of data stick mapping to the memory row of FIG. 7 where each data stick occupies 1 sub-segment with zero padding according to an embodiment of the present invention.

Referring to FIG. 17, an example is depicted where the $N_{out}$ is 8 data-elements. As provided above, each sub-segment has a width of 4. Thus, in this example the data stick size is 8 and, in the data stick mapping shown in FIG. 17, each of Stick 1, Stick 2 and Stick 3 occupies 2 sub-segments.

In a third set of the examples, a different scenario is illustrated, namely that shown in FIG. 7 where each row in memory 402 is divided into 8 segments, Seg0 through Seg7 (each segment having a width of 64), and each segment is divided into 8 sub-segments, SS0 through SS7 (each sub-segment having a width of 8). Each of the following examples will involve the mapping of the three data sticks, Stick 1, Stick 2 and Stick 3 (see FIG. 11), to these segments and/or sub-segments.

Here, the data stick size is less than the segment width, requiring that the data sticks be mapped to the sub-segments. In that case, both segment-level rotations and sub-segment-level shifts (see above) are needed for alignment. Namely, referring to FIG. 18, an example is depicted where $N_{out}$ is 3 data-elements. As provided above, each sub-segment in this example has a width of 8. Thus, the data sticks in this example are smaller than a sub-segment. As such, (5) zeros are used to pad the sub-segments making the data stick size 8 (3 valids+5 zeros) and, in the data stick mapping shown in FIG. 18, each of Stick 1, Stick 2 and Stick 3 occupies 1 sub-segment.

Figure 19:
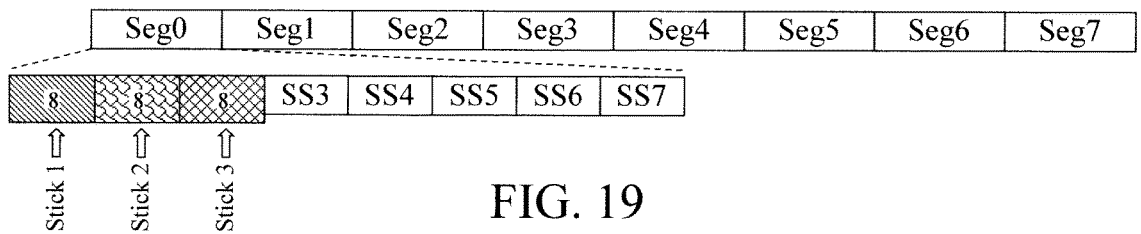
FIG. 19 is a diagram illustrating an example of data stick mapping to the memory row of FIG. 7 where each data stick occupies 1 sub-segment according to an embodiment of the present invention.

Referring to FIG. 19, an example is depicted where the $N_{out}$ is 8 data-elements. As provided above, each sub-segment has a width of 8. Thus, in this example the data stick size is 8 and, in the data stick mapping shown in FIG. 19, each of Stick 1, Stick 2 and Stick 3 occupies 1 sub-segment.

FIGS. 20-24 illustrate logical to physical mapping where the above-described logical arrangements are mapped to an aligner-logic friendly physical vector layout (also referred to herein as an 'Aligner-Logic Vector Layout'). Namely, as provided above, a row in memory 402 is (logically) divided into a hierarchy of logical segments and sub-segments with each of the segments including more than one of the sub-segments. Each of the sub-segments includes multiple words, and each of the words includes multiple data-bits. See, for example, FIG. 20.

Figure 20:
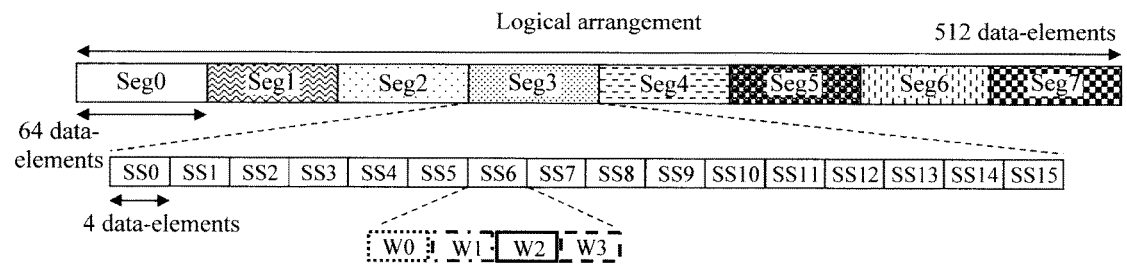
FIG. 20 is a diagram illustrating a logical arrangement for logical to physical mapping to an Aligner-Logic Vector Layout according to an embodiment of the present invention.

As shown in FIG. 20, in the present example, a row in memory 402 that contains 512 data-elements has been logically divided into 8 segments, Seg0 through Seg7, each segment having 64 data-elements (which defines the segment width). Each segment is further divided into 16 sub-segments, SS0 through SS15, each sub-segment having 4 data-elements (which defines the sub-segment width). As provided above, the terms 'data-elements' and 'words' are being used interchangeably herein. Thus, the 4 data-elements or words (W) making-up each sub-segment are labeled in FIG. 20 as W0-W3. As is the convention being used throughout the figures, the sub-segments of only one of the segments, and the words of only one of the sub-segments are shown in FIG. 20. However, it is to be understood that each of the segments Seg0 through Seg7 similarly contains 16 sub-segments SS0 through SS15, and each of the sub-segments SS0 through SS15 similarly contains 4 data-elements (or words). This (logical) hierarchical configuration of the segments, sub-segments, words (and corresponding data-bits—see above) is also referred to herein as a 'logical arrangement.' To help illustrate the present logical to physical mapping techniques, a unique pattern is being used for each of the segments, and a unique outline hatching is being used for each of the words.

As highlighted above, the physical organization of the data-elements is such that the data-elements from different data sticks that share the same sub-segment and the same 'element-number' within that sub-segment (e.g., data-element 1 of 4) will sit in ordered proximity of their segment number. As will become apparent from the figures that follow, this physical organization of the data-elements involves physically mapping the data-bits such that the words belonging to a same given one of the sub-segments are mapped contiguously across all of the segments.

Figures 21, 22:
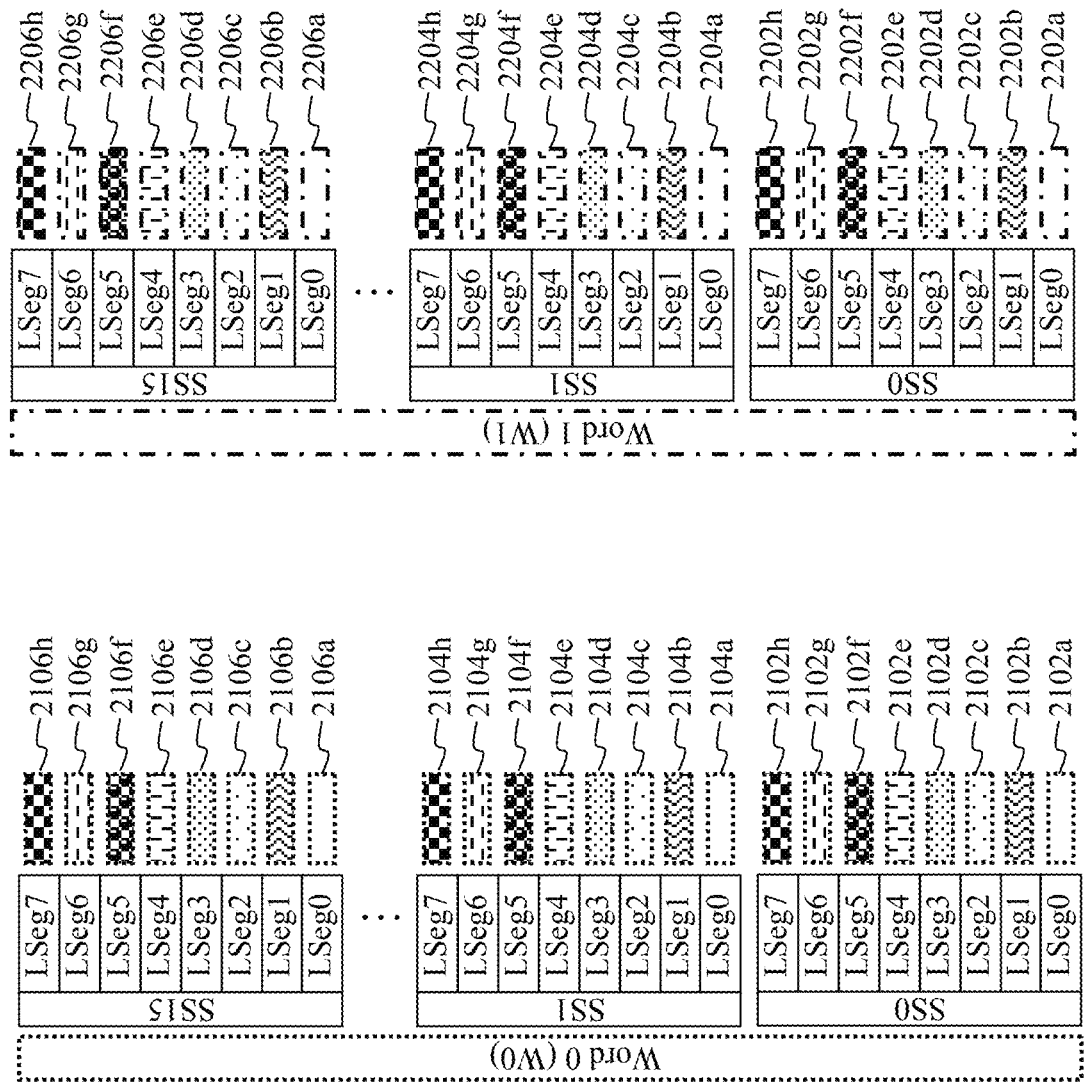
FIG. 21 is a diagram illustrating the Aligner-logic Vector Layout at a Word 0 (W0) according to an embodiment of the present invention.
FIG. 22 is a diagram illustrating the Aligner-logic Vector Layout at a Word 1 (W1) according to an embodiment of the present invention.

For instance, referring to FIGS. 21-24, the Aligner-logic Vector Layout across words W0-W3, respectively, are shown. It is notable that FIGS. 21-24 collectively depict one continuous Aligner-logic Vector Layout which has been broken up into multiple figures merely for ease and clarity of depiction. For illustrative purposes only, the data-bits belonging to a particular word (W), sub-segment (SS) and segment (LSeg) are labeled in FIGS. 21-24. For instance, in FIG. 21 each of 2102a-h, 2104a-h, . . . , 2106a-h is a word (data-element) that includes multiple data-bits. Namely, reference numeral 2102a represents the data-bits belonging to word 0 (W0) of sub-segment 0 (SS0) of segment 0 (Lseg0), reference numeral 2102b represents the data-bits belonging to word 0 (W0) of sub-segment 0 (SS0) of segment 1 (Lseg1), reference numeral 2102c represents the data-bits belonging to word 0 (W0) of sub-segment 0 (SS0) of segment 2 (Lseg2), and so on. Likewise, reference numeral 2104a represents the data-bits belonging to word 0 (W0) of sub-segment 1 (SS1) of segment 0 (Lseg0), reference numeral 2104b represents the data-bits belonging to word 0 (W0) of sub-segment 1 (SS1) of segment 1 (Lseg1), reference numeral 2104c represents the data-bits belonging to word 0 (W0) of sub-segment 1 (SS1) of segment 2 (Lseg2), and so on. This arrangement continues in the same manner to the end of SS15. Namely, as shown in FIG. 21, reference numeral 2106a represents the data-bits belonging to word 0 (W0) of sub-segment 15 (SS15) of segment 0 (Lseg0), reference numeral 2106b represents the data-bits belonging to word 0 (W0) of sub-segment 15 (SS15) of segment 1 (Lseg1), reference numeral 2106c represents the data-bits belonging to word 0 (W0) of sub-segment 15 (SS15) of segment 2 (Lseg2), and so on. Thus, it can be clearly seen that all of the words 2102a-h, etc. until the end of SS15 are word0, but it is notable that the word0 width does not increase during the physical mapping.

Based on the segment patterning and word outline hatching used (see description of FIG. 20, above) it can be clearly seen in FIG. 21 that the data-bits belonging to word 2102a (i.e., data-bits belonging to (e.g., an $M^{th}$) Word 0 (W0) of (e.g., a $K^{th}$) sub-segment 0 (SS0) of segment 0 (LSeg0)) are positioned next to (i.e., contiguous with) the data-bits belonging to word 2102b (i.e., data-bits belonging to W0 of SS0 of LSeg1), which are positioned next to the data-bits belonging to word 2102c (i.e., data-bits belonging to W0 of SS0 of LSeg2), and so on. Likewise, the data-bits belonging to word 2104a (i.e., data-bits belonging to W0 of $((K+1)^{th})$ SS1 of LSeg0) are positioned next to (i.e., contiguous with) the data-bits belonging to word 2104b (i.e., data-bits belonging to W0 of SS1 of LSeg1), which are positioned next to the data-bits belonging to word 2104c (i.e., data-bits belonging to W0 of SS1 of LSeg2), and so on. This arrangement continues in the same manner to the end of SS15. Namely, as shown in FIG. 21, the data-bits belonging to word 2106a (i.e., data-bits belonging to W0 of $((K+15)^{th})$ SS15 of LSeg0) are positioned next to (i.e., contiguous with) the data-bits belonging to word 2106b (i.e., data-bits belonging to W0 of SS15 of LSeg1), which are positioned next to the data-bits belonging to word 2106c (i.e., data-bits belonging to W0 of SS15 of LSeg2), and so on.

As can be seen in FIG. 21 (and FIGS. 22-24, below), this physical organization is inverted as compared to the logical arrangement shown in FIG. 20 above. Namely, in the logical arrangement, the hierarchy involves segments divided into sub-segments, sub-segments divided into words, and words divided into data-bits. By comparison, the physical organization involves arrangement of the data-bits belonging to a particular word, in each of the sub-segments, across all of the segments. Thus, the present logical to physical mapping may also be referred to herein as 'inside-out mapping.' Advantageously, this inside-out mapping minimizes the distance between the words of a particular one of the sub-segments (e.g., $M^{th}$ word of $K^{th}$ sub-segment) across all of the segments (e.g., LSeg0 through LSeg7). This mapping scheme also minimizes the distance between instances of a same given one of the words (e.g., $M^{th}$ word) in each of the sub-segments (e.g., SS0 through SS15) across all of the segments (e.g., LSeg0 through LSeg7).

Similarly, in FIG. 22, each of 2202a-h, 2204a-h, . . . , 2206a-h is a word (data-element) that includes multiple data-bits. Namely, reference numeral 2202a represents the data-bits belonging to W1 of SS0 of Lseg0, reference numeral 2202b represents the data-bits belonging to W1 of SS0 of Lseg1, reference numeral 2202c represents the data-bits belonging to W1 of SS0 of Lseg2, and so on. Likewise, reference numeral 2204a represents the data-bits belonging to W1 of SS1 of Lseg0, reference numeral 2204b represents the data-bits belonging to W1 of SS1 of Lseg1, reference numeral 2204c represents the data-bits belonging to W1 of SS1 of Lseg2, and so on. This arrangement continues in the same manner to the end of SS15. Namely, as shown in FIG. 22, reference numeral 2206a represents the data-bits belonging to W1 of SS15 of Lseg0, reference numeral 2206b represents the data-bits belonging to W1 of SS15 of Lseg1, reference numeral 2206c represents the data-bits belonging to W1 of SS15 of Lseg2, and so on. Thus, it can be clearly seen that all of the words 2202a-h, etc. until the end of SS15 are word1, but it is notable that the word1 width does not increase during the physical mapping.

As shown in FIG. 22, the Aligner-logic Vector Layout has the data-bits belonging to word 2202a (i.e., data-bits belonging to (e.g., an $(M+1)^{th}$) Word 1 (W1) of (e.g., a $K^{th}$) sub-segment 0 (SS0) of segment 0 (LSeg0)) positioned next to (i.e., contiguous with) the data-bits belonging to word 2202b (i.e., data-bits belonging to W1 of SS0 of LSeg1), which are positioned next to the data-bits belonging to word 2202c (i.e., data-bits belonging to W1 of SS0 of LSeg2), and so on. Likewise, the data-bits belonging to word 2204a (i.e., data-bits belonging to W1 of $((K+1)^{th})$ SS1 of LSeg0) are positioned next to (i.e., contiguous with) the data-bits belonging to word 2204b (i.e., data-bits belonging to W1 of SS1 of LSeg1), which are positioned next to the data-bits belonging to word 2204c (i.e., data-bits belonging to W1 of SS1 of LSeg2), and so on. This arrangement continues in the same manner to the end of SS15. Namely, as shown in FIG. 22, the data-bits belonging to word 2206a (i.e., data-bits belonging to W1 of $((K+15)^{th})$ SS15 of LSeg0) are positioned next to (i.e., contiguous with) the data-bits belonging to word 2206b (i.e., data-bits belonging to W1 of SS15 of LSeg1), which are positioned next to the data-bits belonging to word 2206c (i.e., data-bits belonging to W1 of SS15 of LSeg2), and so on.

In the same manner, as shown in FIG. 23, each of 2302a-h, 2304a-h, . . . , 2306a-h is a word (data-element) that includes multiple data-bits. Namely, reference numeral 2302a represents the data-bits belonging to W2 of SS0 of Lseg0, reference numeral 2302b represents the data-bits belonging to W2 of SS0 of Lseg1, reference numeral 2302c represents the data-bits belonging to W2 of SS0 of Lseg2, and so on. Likewise, reference numeral 2304a represents the data-bits belonging to W2 of SS1 of Lseg0, reference numeral 2304b represents the data-bits belonging to W2 of SS1 of Lseg1, reference numeral 2304c represents the data-bits belonging to W2 of SS1 of Lseg2, and so on. This arrangement continues in the same manner to the end of SS15. Namely, as shown in FIG. 23, reference numeral 2306a represents the data-bits belonging to W2 of SS15 of Lseg0, reference numeral 2306b represents the data-bits belonging to W2 of SS15 of Lseg1, reference numeral 2306c represents the data-bits belonging to W2 of SS15 of Lseg2, and so on. Thus, it can be clearly seen that all of the words 2302a-h, etc. until the end of SS15 are word2, but it is notable that the word2 width does not increase during the physical mapping.

As shown in FIG. 23, the Aligner-logic Vector Layout has the data-bits belonging to word 2302a (i.e., data-bits belonging to (e.g., an $(M+2)^{th}$) Word 2 (W2) of (e.g., a $K^{th}$) sub-segment 0 (SS0) of segment 0 (LSeg0)) positioned next to (i.e., contiguous with) the data-bits belonging to word 2302b (i.e., data-bits belonging to W2 of SS0 of LSeg1), which are positioned next to the data-bits belonging to word 2302c (i.e., data-bits belonging to W2 of SS0 of LSeg2), and so on. Likewise, the data-bits belonging to word 2304a (i.e., data-bits belonging to W2 of $((K+1)^{th})$ SS1 of LSeg0) are positioned next to (i.e., contiguous with) the data-bits belonging to word 2304b (i.e., data-bits belonging to W2 of SS1 of LSeg1), which are positioned next to the data-bits belonging to word 2304c (i.e., data-bits belonging to W2 of SS1 of LSeg2), and so on. This arrangement continues in the same manner to the end of SS15. Namely, as shown in FIG. 23, the data-bits belonging to word 2306a (i.e., data-bits belonging to W2 of $((K+15)^{th})$ SS15 of LSeg0) are positioned next to (i.e., contiguous with) the data-bits belonging to word 2306b (i.e., data-bits belonging to W2 of SS15 of LSeg 1), which are positioned next to the data-bits belonging to word 2306c (i.e., data-bits belonging to W2 of SS15 of LSeg2), and so on.

Similarly, as shown in FIG. 24, each of 2402a-h, 2404a-h, . . . , 2406a-h is a word (data-element) that includes multiple data-bits. Namely, reference numeral 2402a represents the data-bits belonging to W3 of SS0 of Lseg0, reference numeral 2402b represents the data-bits belonging to W3 of SS0 of Lseg1, reference numeral 2402c represents the data-bits belonging to W3 of SS0 of Lseg2, and so on. Likewise, reference numeral 2404a represents the data-bits belonging to W3 of SS1 of Lseg0, reference numeral 2404b represents the data-bits belonging to W3 of SS1 of Lseg1, reference numeral 2404c represents the data-bits belonging to W3 of SS1 of Lseg2, and so on. This arrangement continues in the same manner to the end of SS15. Namely, as shown in FIG. 24, reference numeral 2406a represents the data-bits belonging to W3 of SS15 of Lseg0, reference numeral 2406b represents the data-bits belonging to W3 of SS15 of Lseg1, reference numeral 2406c represents the data-bits belonging to W3 of SS15 of Lseg2, and so on. Thus, it can be clearly seen that all of the words 2402a-h, etc. until the end of SS15 are word3, but it is notable that the word3 width does not increase during the physical mapping.

As shown in FIG. 24, the Aligner-logic Vector Layout has the data-bits belonging to word 2402a (i.e., data-bits belonging to (e.g., an $(M+3)^{th}$) Word 3 (W3) of (e.g., a $K^{th}$) sub-segment 0 (SS0) of segment 0 (LSeg0)) positioned next to (i.e., contiguous with) the data-bits belonging to word 2402b (i.e., data-bits belonging to W3 of SS0 of LSeg1), which are positioned next to the data-bits belonging to word 2402c (i.e., data-bits belonging to W3 of SS0 of LSeg2), and so on. Likewise, the data-bits belonging to word 2404a (i.e., data-bits belonging to W3 of $((K+1)^{th})$ SS1 of LSeg0) are positioned next to (i.e., contiguous with) the data-bits belonging to word 2404b (i.e., data-bits belonging to W3 of SS1 of LSeg1), which are positioned next to the data-bits belonging to word 2404c (i.e., data-bits belonging to W3 of SS1 of LSeg2), and so on. This arrangement continues in the same manner to the end of SS15. Namely, as shown in FIG. 24, the data-bits belonging to word 2406a (i.e., data-bits belonging to W3 of $((K+15)^{th})$ SS15 of LSeg0) are positioned next to (i.e., contiguous with) the data-bits belonging to word 2406b (i.e., data-bits belonging to W3 of SS15 of LSeg1), which are positioned next to the data-bits belonging to word 2406c (i.e., data-bits belonging to W3 of SS15 of LSeg2), and so on.

Figure 25:
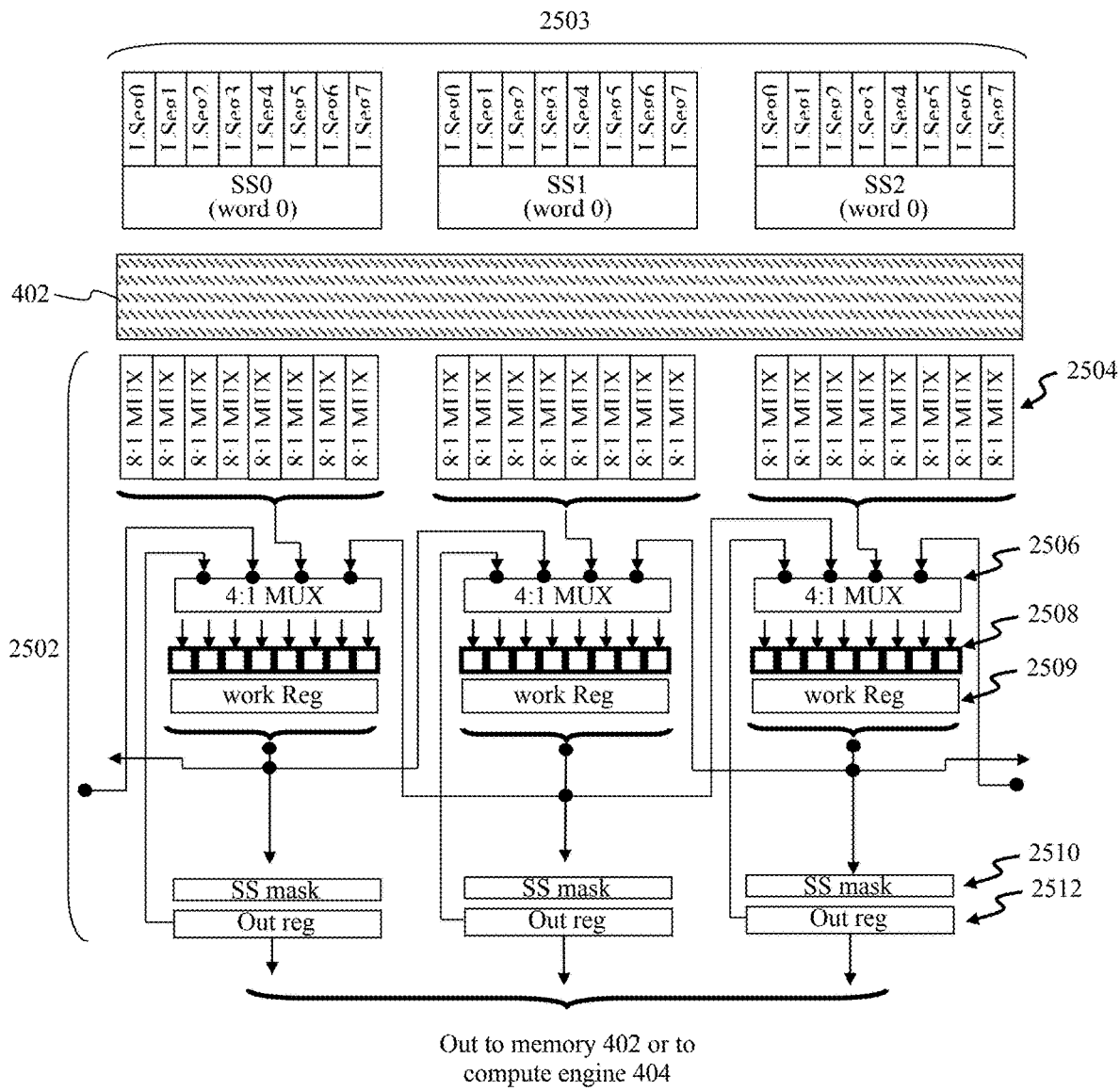
FIG. 25 is a diagram illustrating an exemplary hardware Aligner Logic Unit according to an embodiment of the present invention.

FIG. 25 is a diagram illustrating an exemplary hardware Aligner Logic Unit 2502 having sets of (first) multiplexers (MUX) 2504, a set of (second) multiplexers (MUX) 2506, segment mask-registers 2508 and sub-segment mask-registers 2510. Namely, as shown in FIG. 25, an Aligner-Logic Vector Layout 2503 (i.e., a physical organization of the data-elements by segment, sub-segment, word and data-bit) is mapped from a logical arrangement of the raw data pulled from a row of memory 402. The details of logical to physical mapping were provided above. In the present example, each row of memory 402 is divided into 8 segments, Seg0 through Seg7, as was shown for example in FIG. 7 above. As provided above, the present physical organization of the data-elements advantageously supports segment rotations and sub-segment shifts while physically moving data-words over only over very short distances.

Multiplexers, abbreviated herein as MUX, are digital switches that act as data selectors. Multiplexers receive data from multiple inputs, and route data from a given one of the inputs to a single output. The Aligner-Logic Vector Layout 2503 is provided to the sets of first multiplexers 2504 which are configured to perform segment-level alignment operations (see above). For ease and clarity of depiction, FIG. 25 shows the first three sub-segments of word0, i.e., SS0 (word0), SS1 (word0) and SS2 (word0). However, it is to be understood that these segment-level alignment operations will be performed on each of the words in each of the segments and sub-segments. Thus, there are 8 multiplexers 2504 in each set to allow for the selection of specific segments in a particular order, i.e., there are 8 multiplexers 2504 for performing segment-level alignment operations on word 0 of SS0, 8 multiplexers 2504 for performing segment-level alignment operations on word 0 of SS1, and so on.

The output from the sets of first multiplexers 2504 is then fed to the set of second multiplexers 2506, which are configured to perform sub-segment-level alignment operations (see above) on the 3 sub-segments SS0, SS1 and SS2, in each of the segments Seg0 through Seg7. Thus, there are 3 second multiplexers 2506 in the set to allow for the selection of specific sub-segments in a particular order. As described above, these segment-level and sub-segment-level alignment operations produce an aligned data-vector.

The output (i.e., the aligned data-vector) from the set of second multiplexers 2506 passes through the segment mask-registers 2508 to a work register 2509. As detailed above, bit masking is used herein to filter data from the aligned data-vector. Namely, only those portions of the aligned data-vector having the appropriate mask-bit set in the segment mask-register 2508 and a sub-segment-mask register 2510 will be transferred to an output-vector register 2512. For instance, where mask-bits are zero, the previous contents of the output-vector register 2512 remain unchanged.

Figure 26:
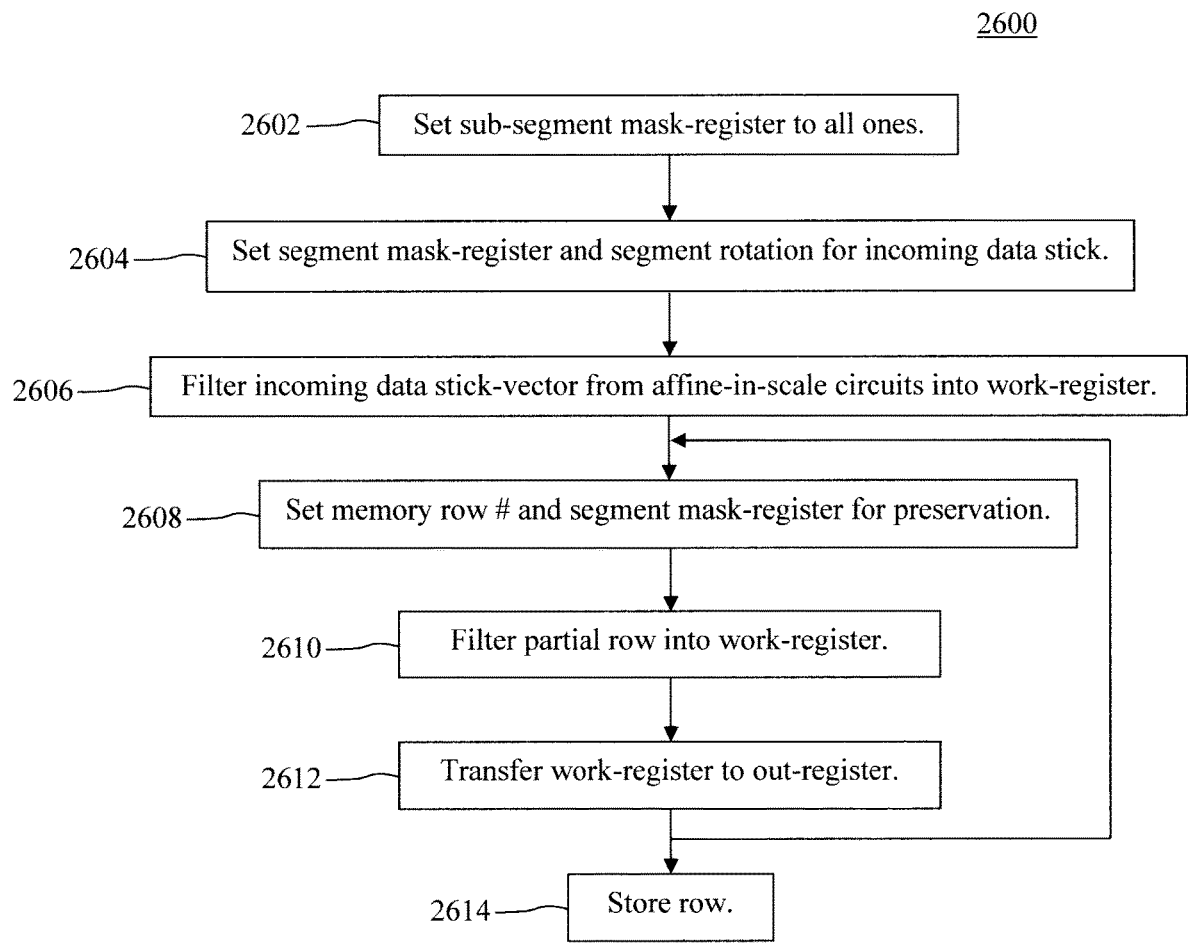
FIG. 26 is a diagram illustrating an exemplary methodology for storing each incoming data stick using the hardware Aligner Logic Unit according to an embodiment of the present invention.

FIG. 26 is a diagram illustrating an exemplary methodology 2600 for storing each incoming data stick using the hardware Aligner Logic Unit 2502 of FIG. 25. In the present example, there are no known convolutional layers with incoming data needing sub-segment-level shifts. Thus, in step 2602 the sub-segment-mask register 2510 is set to all ones.

In step 2604, the segment mask-register 2508 and segment rotation are set for the next incoming data stick. As provided above, this involves setting the appropriate mask-bit in the segment mask-register 2508. For instance, only those portions of the aligned data-vector where mask-bits are one will be transferred to the output-vector register 2512. As also provided above, the segment rotations involve shifts by 1, 2, etc. segments and occur clockwise or counterclockwise. These segment rotation parameters are set in step 2604.

In step 2606, the incoming stick vector either directly or through transfer row from memory 402 is filtered into the work register 2509. As provided above, the segment mask-register 2508 is used to filter data from the aligned data-vector into the work register 2509. In step 2608, the row #(from memory 402), the segment mask-register 2508, and segment shift=0 are set for preservation. For instance, in step 2608 the memory address is set to (row #) X. Data read from memory row X is then used to overwrite a sub-set of segments (data-elements) already present in the work register 2509.

In step 2610, the partial row from memory 402 is filtered into the work register 2509. Namely, data-elements to be preserved in the work register 2509 are masked, while others are overwritten with non-masked data elements from row X. Thus, in step 2610, there is a partial writing of data from memory row X, as some portions are retained by setting the mask to zero. As provided above, the sub-segment-mask register 2510 is used to filter data from the aligned data-vector. In step 2612, the data is transferred from the work register 2509 to the output-vector register 2512. As shown in FIG. 26, steps 2608-2612 can be repeated multiple times. Finally, in step 2614 the row is stored in memory 402.

Figure 27:
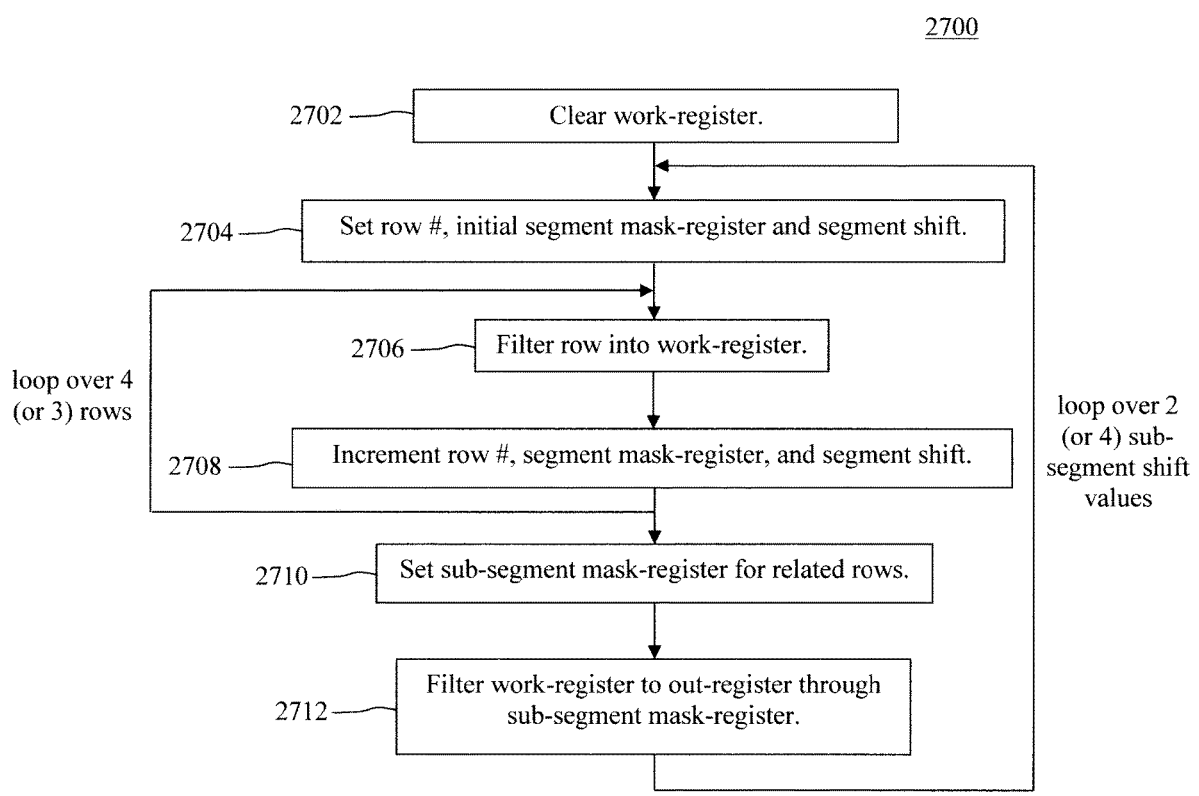
FIG. 27 is a diagram illustrating an exemplary methodology for preparing an outgoing data stick for a first convolutional layer using the hardware Aligner Logic Unit according to an embodiment of the present invention.

FIG. 27 is a diagram illustrating an exemplary methodology 2700 for preparing an outgoing data stick for a first convolutional layer (Conv1) using the hardware Aligner Logic Unit 2502 of FIG. 25. In the present example, Conv1 of the CNN (embodied in compute engine 404) has 7×7 filter kernels, and the data stick size is 4 (i.e., the data-stick (input stick) size is 4 data-elements or 4 words).

In step 2702, the work register 2509 is cleared. As shown in FIG. 27, a loop is then begun over 2 (or 4) sub-segment shift values (see, e.g., FIGS. 9A and 9B, described above). Namely, in step 2704 the row #(from memory 402), the initial segment mask-register 2508, and segment shift (e.g., clockwise or counterclockwise segment rotations by 1, 2, etc. segments) are set.

In step 2706, the currently selected row from memory 402 is read and filtered through the segment mask-register 2508 into the work register 2509. The details of segment mask-register 2508 were provided above. As also described in detail above, the first multiplexers 2504 are configured to perform segment-level alignment operations on the raw data from the selected row, and the set of second multiplexers 2506 are configured to perform sub-segment-level alignment operations on the raw data from the selected row. In step 2708, the row # is incremented to another row from memory 402, and the segment mask-register 2508 and segment shift (e.g., clockwise or counterclockwise segment rotations by 1, 2, etc. segments) are set for that other row. As shown in FIG. 27, steps 2706 and 2708 are then repeated over 4 (or 3) different rows from memory 402 to implement the sub-segment shift amongst these rows. Namely, as provided above, there are 7×7 filter kernels. The 7×7=49 data sticks needed can be present in 8 to 12 memory rows (i.e., since the outer loop is 2 or 4 and the inner loop is 4 or 3, then 8 to 12 rows are read in total).

In step 2710, the sub-segment-mask register 2510 is set for the related rows (those rows that share the same sub-segment masks) from memory 402. The details of sub-segment-mask register 2510 were provided above. In step 2712, the work register 2509 is filtered to the output-vector register 2512 through the sub-segment-mask register 2510. As shown in FIG. 27, steps 2714-2712 are then repeated over different sub-segment mask values.

Figure 28:
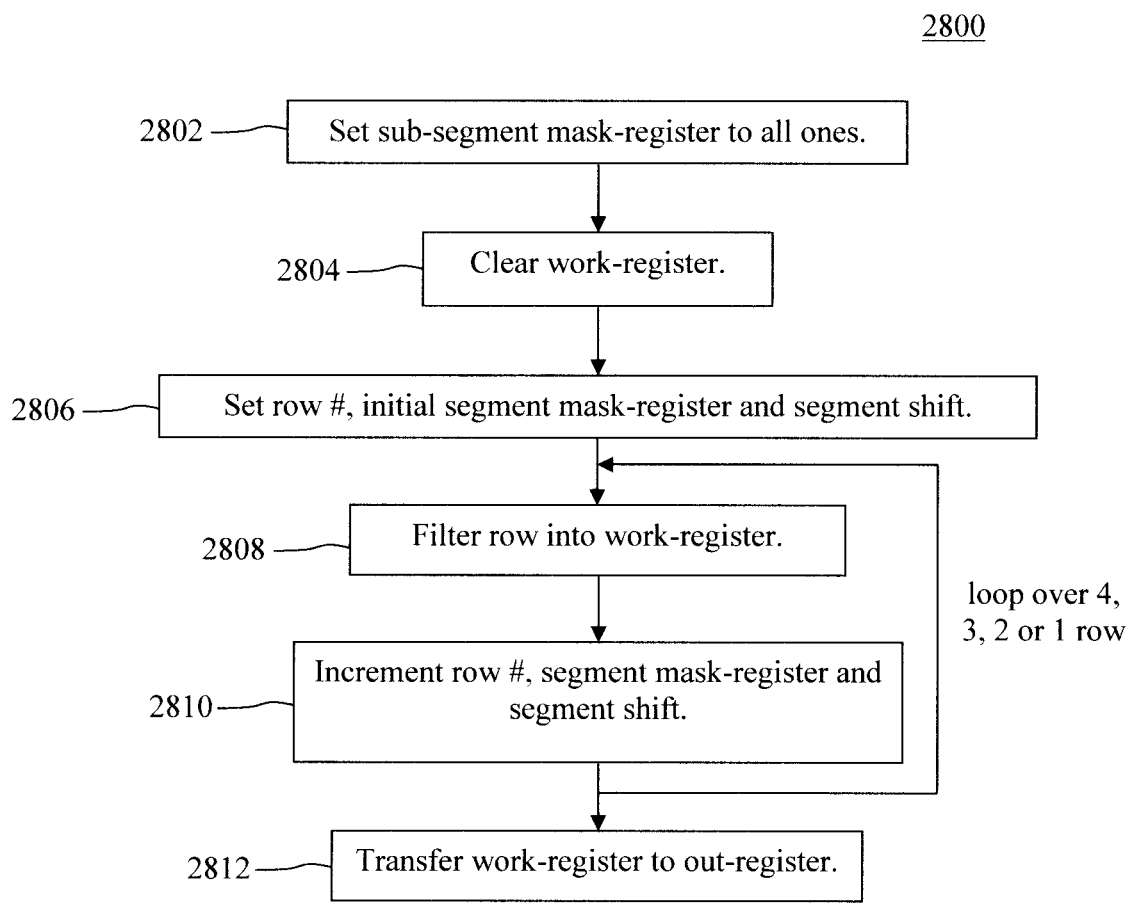
FIG. 28 is a diagram illustrating an exemplary methodology for preparing an outgoing data stick for a second convolutional layer using the hardware Aligner Logic Unit according to an embodiment of the present invention.

FIG. 28 is a diagram illustrating an exemplary methodology 2800 for preparing an outgoing data stick for a second convolutional layer (Conv2) using the hardware Aligner Logic Unit 2502 of FIG. 25. In the present example, Conv2 of the CNN (embodied in compute engine 404) has 3×3 filter kernels, and the data stick size is 1 segment (64 data-elements).

In step 2802, the sub-segment-mask register 2510 is set to all ones. The details of sub-segment-mask register 2510 were provided above. In step 2804, the work register 2509 is cleared.

In step 2806, the row #(from memory 402), the initial segment mask-register 2508, and segment shift (e.g., clockwise or counterclockwise segment rotations by 1, 2, etc. segments) are set. The details of segment mask-register 2508 were provided above. A loop is then begun over 4, 3, 2 or 1 row from memory 402. Namely, as provided above, there are 3×3 filter kernels. As such, 3×3=9 data sticks are needed. Those 9 data sticks are present in 4, 3, 2 or 1 row in memory 402. Also, a data stick size of 1 is needed because 9 sticks are sent as two packets, one containing 8 sticks and the other containing 1 stick.

Thus, in step 2808 the currently selected row from memory 402 is filtered through the segment mask-register 2508 into the work register 2509. As described in detail above, the first multiplexers 2504 are configured to perform segment-level alignment operations on the raw data from the selected row, and the set of second multiplexers 2506 are configured to perform sub-segment-level alignment operations on the raw data from the selected row. In step 2810, the row #is incremented to another row from memory 402, and the segment mask-register 2508 and segment shift (e.g., clockwise or counterclockwise segment rotations by 1, 2, etc. segments) are set for that other row. As shown in FIG. 28, steps 2808 and 2810 are then repeated over 4, 3, 2 or 1 different rows from memory 402.

In step 2812, the work register 2509 is filtered to the output-vector register 2512 through the sub-segment-mask register 2510. The details of sub-segment-mask register 2510 were provided above.

The present techniques are further illustrated by way of reference to the following non-limiting examples. As provided above, the weights (operands) across the rows and/or columns of the analog AI crossbar array can be rearranged using valid-zero interleaving mapping in order to efficiently utilize the aligned data. This rearrangement operation is further illustrated by way of reference to the examples depicted in FIG. 29 and FIG. 30.

Figure 29:
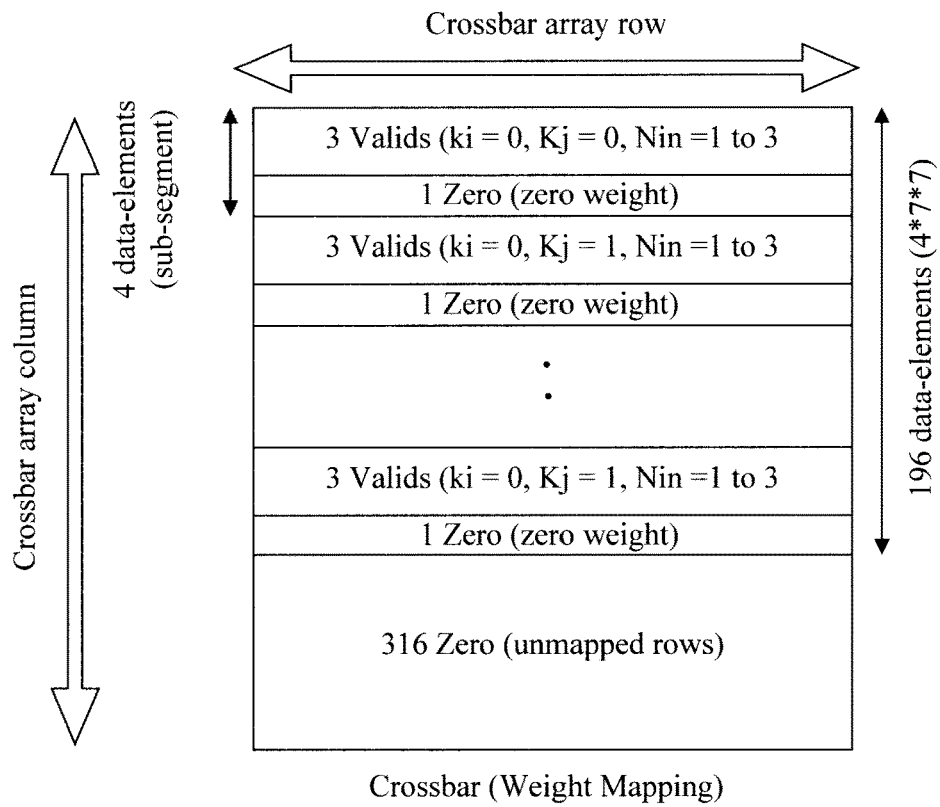
FIG. 29 is a diagram illustrating an example of the weights (operands) having been rearranged using valid-zero interleaving mapping according to an embodiment of the present invention.

Referring first to FIG. 29, a logical view is shown where the weights (operands) are physically arranged in the Aligner-Logic Vector Layout. In this example, the row from memory 402 has been logically divided into 8 segments, and 16 sub-segments per segment. In the first convolutional layer, $N_{in}=3$ data-elements, $N_i=N_j=224$, $K_i=K_j=7$, and $N_{out}=64$ data-elements. Thus, the input tensor is $N_{in}=3$, $N_i=N_j=224$, and the weight matrix is 147

($N_{in}=3*K_i=7*K_j=7)\times 64$ ($N_{out}=64$). The input data stick=$N_{in}=3$ data-elements, and the sub-segment width is 4 data-elements. Thus, the input sticks<sub-segment width, which is the worst-case scenario as it involves both segment-level and sub-segment level alignment operations.

As shown in the logical view of FIG. 29, the weights across the rows in the analog AI crossbar array are rearranged by padding the input stick with 1 zero (i.e., 3 valids and 1 zero). This is what is referred to herein as 'valid-zero interleaving mapping.' It is notable that this valid-zero interleaving mapping is also applicable to outputs generated from columns.

Figure 30:
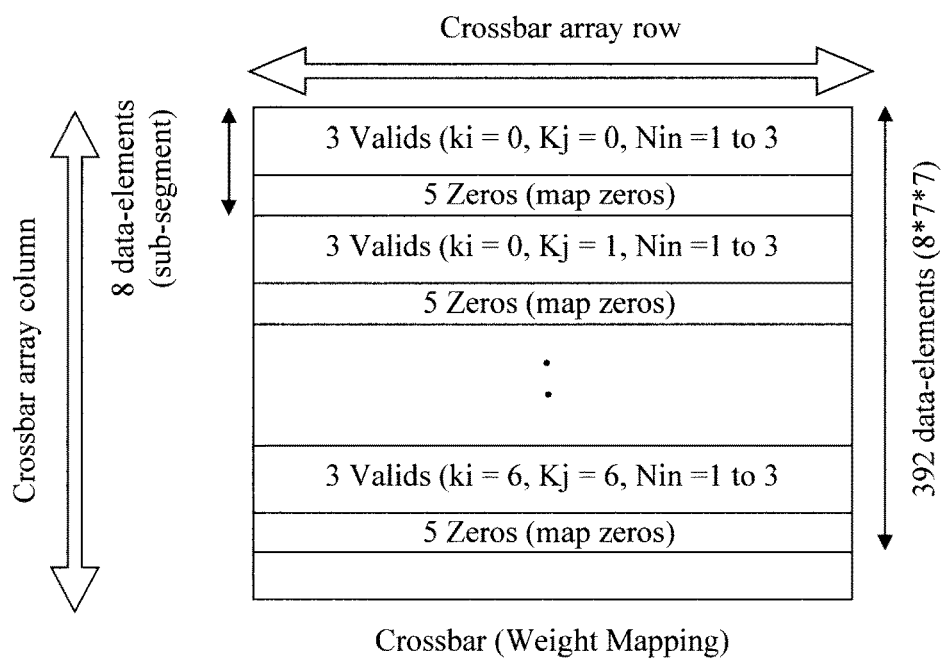
FIG. 30 is a diagram illustrating another example of the weights (operands) having been rearranged using valid-zero interleaving mapping according to an embodiment of the present invention.

Referring next to FIG. 30, a logical view is shown where, like in the previous example, the weights (operands) are physically arranged in the Aligner-Logic Vector Layout. In this example the row from memory 402 has been logically divided into 8 segments, and 8 sub-segments per segment. In the first convolutional layer, $N_{in}=3$ data-elements, $N_i=N_j=224$, $K_i=K_j=7$, and $N_{out}=64$ data-elements. Thus, the input tensor is $N_{in}=3$, $N_i=N_j=224$, and the weight matrix is 147 ($N_{in}=3*K_i=7*K_j=7)\times 64$ ($N_{out}=64$). The input data stick=$N_{in}=3$ data-elements, and the sub-segment width is 8 data-elements. Thus, the input sticks<sub-segment width, which is the worst-case scenario as it involves both segment-level and sub-segment level alignment operations.

As shown in FIG. 30, the weights across the rows in the analog AI crossbar array are rearranged by padding the input stick with 5 zeros (i.e., 3 valids and 5 zeros). It is notable that this valid-zero interleaving mapping is also applicable to outputs generated from columns.

Figure 31:
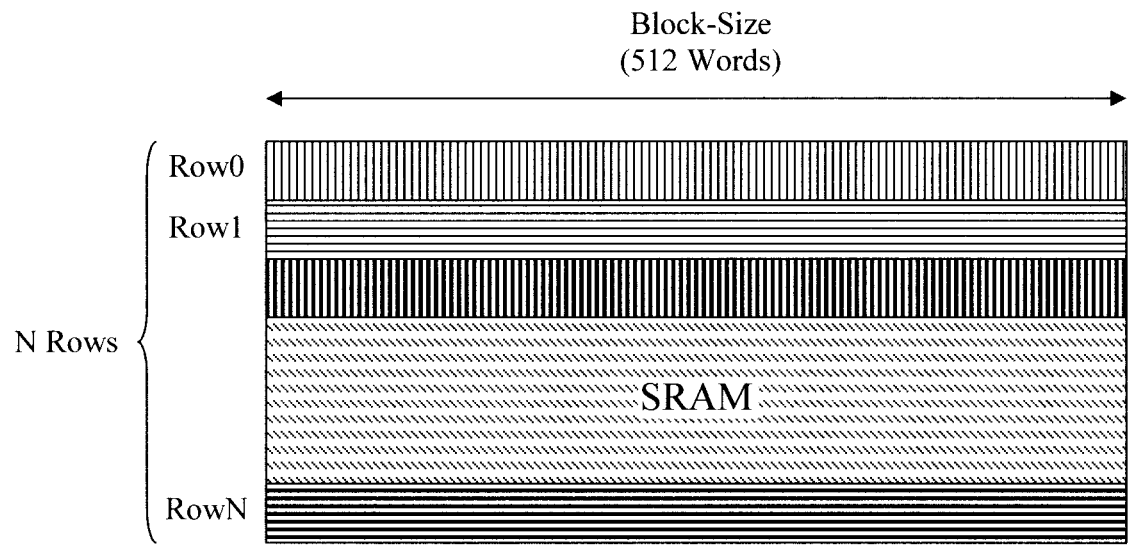
FIG. 31 is a diagram illustrating an exemplary static random access memory (SRAM) of size N×block-size according to an embodiment of the present invention.

As provided above, the present techniques can be applied to a wide data vector coming from and/or going to memory (e.g., an SRAM row). For completeness, FIG. 31 is a schematic diagram illustrates an exemplary SRAM memory of size N×block size, where N is the number of rows, i.e., Row0, Row1, . . . , RowN. In the present, non-limiting example, the block-size is 512 words. It is notable that this logical SRAM can also be realized using multiple small physical SRAM. See FIG. 32.

Figure 32:
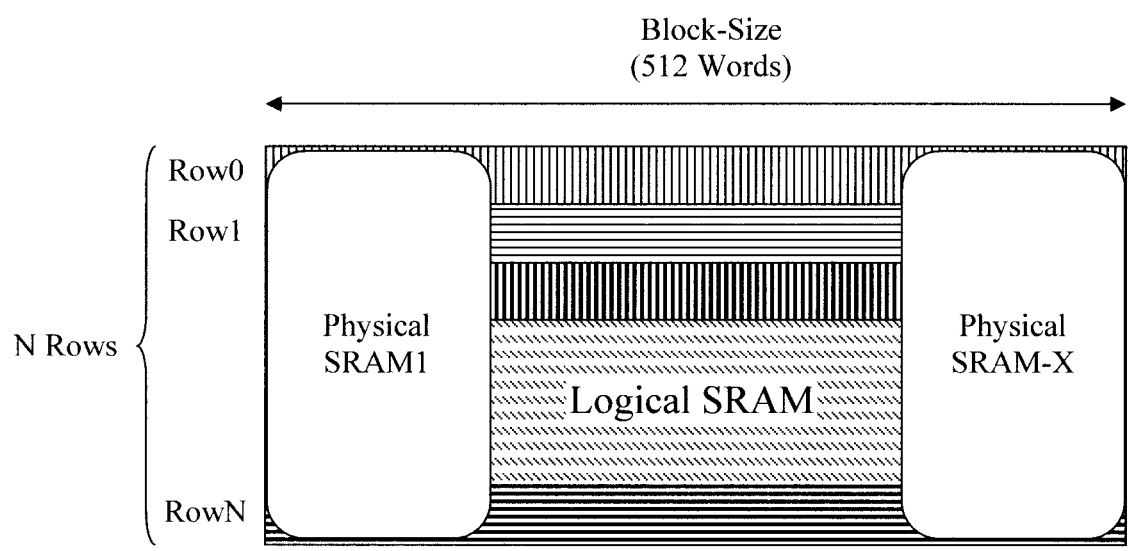
FIG. 32 is a diagram illustrating an exemplary SRAM realized using multiple small physical SRAM according to an embodiment of the present invention.

Namely, in the non-limiting example depicted in FIG. 32, a logical SRAM is realized using multiple small physical SRAM. As in the previous example, for illustrative purposes only, the block-size is 512 words. Thus, 512 words can be read by assembling from the multiple physical SRAMs, such as Physical SRAM1 and Physical SRAM-X shown in FIG. 32.

As will be described below, the present techniques can optionally be provided as a service in a cloud environment. For instance, by way of example only, one or more steps of methodology 600 of FIG. 6 can be performed on a dedicated cloud server.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 33:
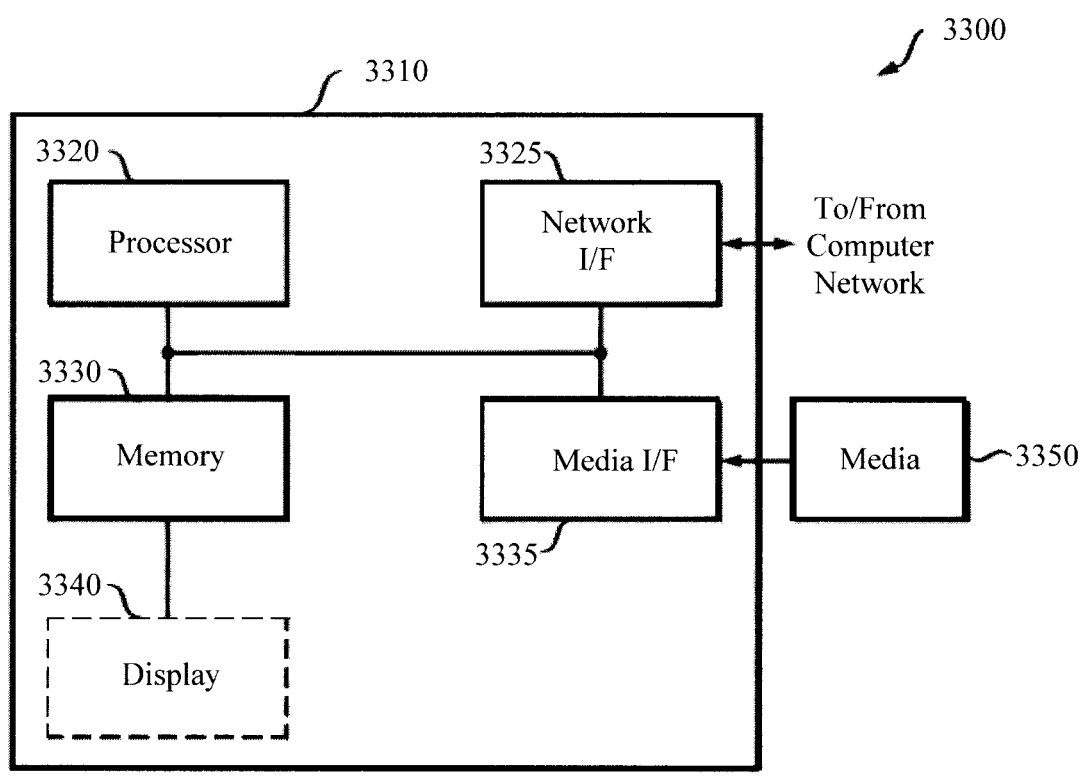
FIG. 33 is a diagram illustrating an exemplary apparatus for performing one or more of the methodologies presented herein according to an embodiment of the present invention.

Turning now to FIG. 33, a block diagram is shown of an apparatus 3300 for implementing one or more of the methodologies presented herein. By way of example only, apparatus 3300 can be configured to implement one or more steps of methodology 600 of FIG. 6, including controlling the hardware Aligner Logic Unit for data alignment operations, filtering, etc.

Apparatus 3300 includes a computer system 3310 and removable media 3350. Computer system 3310 includes a processor device 3320, a network interface 3325, a memory 3330, a media interface 3335 and an optional display 3340. Network interface 3325 allows computer system 3310 to connect to a network, while media interface 3335 allows computer system 3310 to interact with media, such as a hard drive or removable media 3350.

Processor device 3320 can be configured to implement the methods, steps, and functions disclosed herein. The memory 3330 could be distributed or local and the processor device 3320 could be distributed or singular. The memory 3330 could be implemented as an electrical, magnetic or optical memory, or any combination of these or other types of storage devices. Moreover, the term "memory" should be construed broadly enough to encompass any information able to be read from, or written to, an address in the addressable space accessed by processor device 3320. With this definition, information on a network, accessible through network interface 3325, is still within memory 3330 because the processor device 3320 can retrieve the information from the network. It should be noted that each distributed processor that makes up processor device 3320 generally contains its own addressable memory space. It should also be noted that some or all of computer system 3310 can be incorporated into an application-specific or general-use integrated circuit.

Optional display 3340 is any type of display suitable for interacting with a human user of apparatus 3300. Generally, display 3340 is a computer monitor or other similar display.

Figure 34:
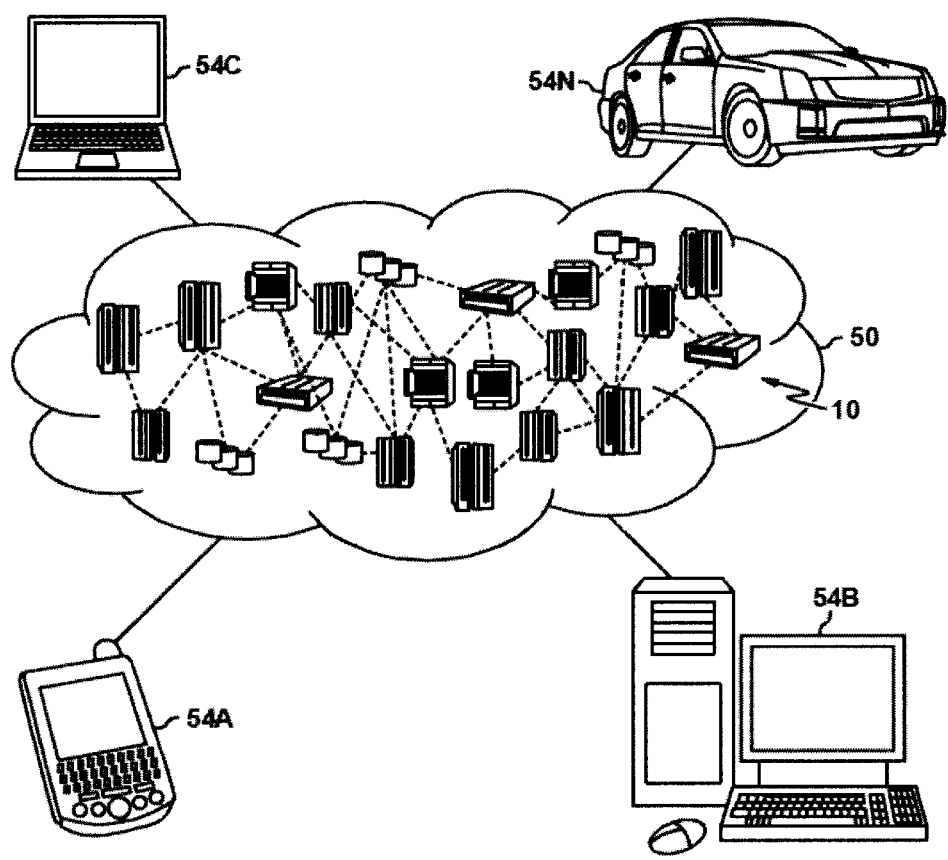
FIG. 34 depicts a cloud computing environment according to an embodiment of the present invention.
Figure 35:
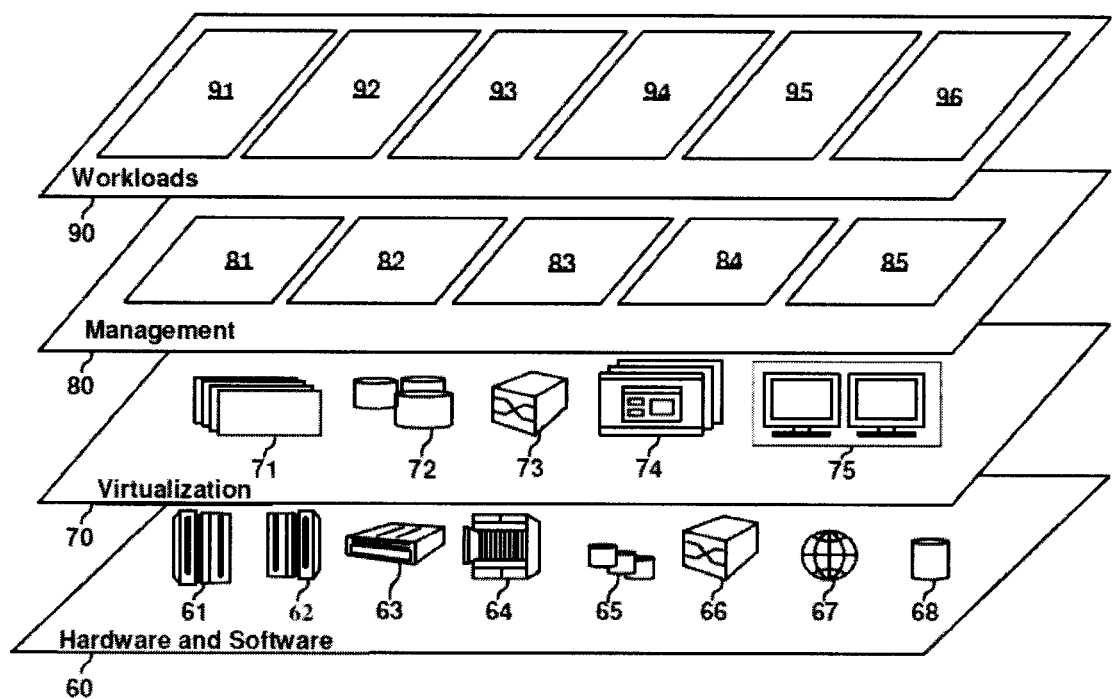
FIG. 35 depicts abstraction model layers according to an embodiment of the present invention.

Referring to FIG. 34 and FIG. 35, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 34, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 34 are intended to be illustrative only and that computing nodes 10 and cloud computing environment 50 can communicate with any type of computerized device over any type of network and/or network addressable connection (e.g., using a web browser).

Referring now to FIG. 35, a set of functional abstraction layers provided by cloud computing environment 50 (FIG. 34) is shown. It should be understood in advance that the components, layers, and functions shown in FIG. 35 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing artificial intelligence (AI) workloads from memory 96.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for processing artificial intelligence (AI) workloads, the method comprising:
   logically dividing a data vector into a hierarchy of segments and sub-segments with each of the segments comprising more than one of the sub-segments, wherein the data vector is a row from memory, each of the sub-segments comprises words, and each of the words comprises data-bits;
   physically mapping the data-bits such that the words belonging to a same given one of the sub-segments are mapped contiguously across all of the segments;

pulling the row from the memory; and performing alignment operations on the segments, the sub-segments, or a combination thereof to create an aligned data-vector.

2. The method of claim 1, wherein the data-bits are physically mapped such that a distance between the words of a particular one of the sub-segments is minimized across all of the segments.

3. The method of claim 1, wherein the data-bits are physically mapped such that a distance between instances of a same given one of the words in each of the sub-segments is minimized across all of the segments.

4. The method of claim 1, wherein the alignment operations comprise one or more of rotating the segments either clockwise or counter-clockwise by at least one of the segments, and shifting the sub-segments either left or right by at least one of the sub-segments.

5. The method of claim 4, wherein the performing of the alignment operations comprises rotating the segments by at least one of the segments, and wherein at least one of the segments is rotated from one end of the row to an opposite end of the row.

6. The method of claim 1, further comprising:
copying a portion of the aligned data-vector into a final output-vector, while selectively masking a remainder of the aligned data-vector.

7. The method of claim 6, further comprising:
repeating the logically dividing, the mapping, the copying, the pulling and the performing iteratively over multiple other rows in the memory.

8. The method of claim 6, further comprising:
transmitting the final output-vector to a compute engine.

9. The method of claim 8, wherein the compute engine comprises an analog AI crossbar array, and wherein the method further comprises:
rearranging weights across rows or columns of the analog AI crossbar array using valid-zero interleaving mapping.

10. An artificial intelligence (AI) accelerator system, comprising:
a memory;
a compute engine connected to the memory; and
a hardware logic unit configured to:
pull a row from the memory, wherein the row is logically divided into a hierarchy of segments and sub-segments with each of the segments comprising more than one of the sub-segments, each of the sub-segments comprising words, and each of the words comprising data-bits, and wherein the data-bits are physically mapped such that the words belonging to a same given one of the sub-segments are mapped contiguously across all of the segments;
perform alignment operations on the segments, sub-segments or combinations thereof to create an aligned data vector;
copy a portion of the aligned data-vector into a final output-vector, while selectively masking a remainder of the aligned data-vector; and
transmit the final output-vector to the compute engine.

11. The AI accelerator system of claim 10, wherein the compute engine comprises an analog AI crossbar array.

12. The AI accelerator system of claim 10, wherein the hardware logic unit when performing the alignment operations is configured to perform one or more of: rotating the segments either clockwise or counter-clockwise by at least one of the segments, and shifting the sub-segments either left or right by at least one of the sub-segments.

13. The AI accelerator system of claim 12, wherein the hardware logic unit comprises:
at least one set of first multiplexers configured to perform the rotating of the segments by at least one of the segments; and
a set of second multiplexers configured to perform the shifting of the sub-segments by at least one of the sub-segments.

14. The AI accelerator system of claim 10, wherein the hardware logic unit comprises:
segment mask-registers configured to mask bits in the aligned data vector from the alignment operations performed on the segments; and
sub-segment mask-registers configured to mask bits in the aligned data vector from the alignment operations performed on the sub-segments.

15. A non-transitory computer program product for processing artificial intelligence (AI) workloads, the computer program product comprising a computer readable storage medium having program instructions embodied therewith, the program instructions executable by a computer to cause the computer to:
logically divide a data vector into a hierarchy of segments and sub-segments with each of the segments comprising more than one of the sub-segments, wherein the data vector is a row from memory each of the sub-segments comprises words, and each of the words comprises data-bits;
physically map the data-bits such that the words belonging to a same given one of the sub-segments are mapped contiguously across all of the segments;
pulling the row from the memory; and
performing alignment operations on the segments, the sub-segments, or a combination thereof to create an aligned data-vector.

16. The non-transitory computer program product of claim 15, wherein the data-bits are physically mapped such that a distance between the words of a particular one of the sub-segments is minimized across all of the segments, and wherein the data-bits are physically mapped such that a distance between instances of a same given one of the words in each of the sub-segments is minimized across all of the segments.

17. The non-transitory computer program product of claim 15, wherein the alignment operations comprise one or more of rotating the segments either clockwise or counter-clockwise by at least one of the segments, and shifting the sub-segments either left or right by at least one of the sub-segments.

18. The non-transitory computer program product of claim 15, wherein the program instructions further cause the computer to:
copy a portion of the aligned data-vector into a final output-vector, while selectively masking a remainder of the aligned data-vector; and
transmit the final output-vector to a compute engine.

19. The method of claim 1, wherein the alignment operations are not performed on data at a granularity finer than the sub-segments.

20. The method of claim 8, wherein the compute engine comprises an analog AI crossbar array that includes an arrangement of uniquely addressable resistive processing units that embody a neural network.

* * * * *